United States Patent
Shah

(10) Patent No.: US 12,223,191 B1
(45) Date of Patent: Feb. 11, 2025

(54) MANAGEMENT OF OPERATING SYSTEM SOFTWARE USING READ-ONLY MULTI-ATTACH BLOCK VOLUMES

(71) Applicant: Amazon Technologies, Inc., Seattle, WA (US)

(72) Inventor: Amit Shah, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/478,624

(22) Filed: Sep. 29, 2023

(51) Int. Cl.
*G06F 3/06* (2006.01)

(52) U.S. Cl.
CPC ............ *G06F 3/064* (2013.01); *G06F 3/0604* (2013.01); *G06F 3/0683* (2013.01)

(58) Field of Classification Search
CPC ....... G06F 3/064; G06F 3/0604; G06F 3/0683
See application file for complete search history.

(56) References Cited

U.S. PATENT DOCUMENTS

| | | | |
|---|---|---|---|
| 5,434,994 | A | 7/1995 | Shaheen et al. |
| 5,574,878 | A | 11/1996 | Onodera et al. |
| 5,815,649 | A | 9/1998 | Utter et al. |
| 6,463,509 | B1 | 10/2002 | Teoman et al. |
| 7,788,664 | B1 | 8/2010 | Janakiraman et al. |
| 7,895,261 | B2 | 2/2011 | Jones et al. |
| 7,953,947 | B2 | 5/2011 | Akutsu et al. |
| 8,280,853 | B1 | 10/2012 | Lai et al. |
| 8,285,687 | B2 | 10/2012 | Voll et al. |
| 8,307,154 | B2 | 11/2012 | Stabrawa et al. |
| 8,321,642 | B1 | 11/2012 | Anzai et al. |
| 8,595,191 | B2 | 11/2013 | Prahlad et al. |
| 8,688,660 | B1 | 4/2014 | Sivasubramanian |
| 8,789,208 | B1 | 7/2014 | Sundaram et al. |
| 8,924,966 | B1 | 12/2014 | Moore |
| 9,110,600 | B1 | 8/2015 | Brooker |
| 9,246,996 | B1 | 1/2016 | Brooker |
| 9,275,124 | B2 | 3/2016 | Sundaram et al. |
| 9,304,867 | B2 | 4/2016 | Sivasubramanian et al. |

(Continued)

FOREIGN PATENT DOCUMENTS

| | | |
|---|---|---|
| WO | 2011/088261 | 7/2011 |
| WO | 2017028885 | 2/2017 |

OTHER PUBLICATIONS

"Amazon EBS API and Command Overview", downloaded Jul. 11, 2013 from doc.aws.amazon.com/AWSEC2/latest/UserGuide/ebs-api-cli-overview.html, p. 1.

(Continued)

*Primary Examiner* — Jae U Yu
(74) *Attorney, Agent, or Firm* — Alexander A. Knapp; Kowert, Hood, Munyon, Rankin & Goetzel, P.C.

(57) ABSTRACT

An operating system, or operating system update, management service uses a shared read-only multi-attach volume of a block-based storage service to distribute operating systems or operating system updates to a set of virtualized computing instances. Also, to store launch specific information, that is specific to a given virtualized computing instance, additional writable volumes are used, wherein a write volume is attached to each of the computing instances of the set. This eliminates the need to provide a full copy of an OS volume to each of the computing instances.

20 Claims, 13 Drawing Sheets

(56) References Cited

U.S. PATENT DOCUMENTS

| | | |
|---|---|---|
| 9,405,483 B1 | 8/2016 | Wei et al. |
| 9,503,517 B1 | 11/2016 | Brooker |
| 9,563,385 B1 | 2/2017 | Kowalski et al. |
| 9,792,060 B2 | 10/2017 | Wei et al. |
| 9,886,213 B2 | 2/2018 | Sivasubramanian et al. |
| 9,916,321 B2 | 3/2018 | Sundaram et al. |
| 10,452,296 B1 | 10/2019 | Greenwood et al. |
| 10,613,789 B1 | 4/2020 | Moore |
| 10,990,464 B1 | 4/2021 | Ping et al. |
| 11,003,483 B1 | 5/2021 | Kowalski et al. |
| 11,461,156 B2 | 10/2022 | Ping et al. |
| 11,755,357 B2 | 9/2023 | Kowalski et al. |
| 2002/0059253 A1 | 5/2002 | Albazz et al. |
| 2003/0191930 A1 | 10/2003 | Viljoen et al. |
| 2004/0078419 A1 | 4/2004 | Ferrari et al. |
| 2004/0148443 A1 | 7/2004 | Achiwa |
| 2006/0010435 A1* | 1/2006 | Jhanwar ............ G06F 8/65 717/168 |
| 2006/0155946 A1 | 7/2006 | Ji |
| 2008/0140905 A1 | 6/2008 | Okuyama |
| 2009/0228889 A1 | 9/2009 | Yoshida |
| 2009/0249470 A1 | 10/2009 | Litvin et al. |
| 2010/0037009 A1 | 2/2010 | Yano et al. |
| 2010/0070725 A1 | 3/2010 | Prahlad et al. |
| 2010/0191922 A1 | 7/2010 | Dickey et al. |
| 2010/0312983 A1 | 12/2010 | Moon et al. |
| 2012/0011394 A1 | 1/2012 | Maki |
| 2012/0079221 A1 | 3/2012 | Sivasubramanian et al. |
| 2012/0254687 A1 | 10/2012 | Leggette et al. |
| 2012/0290802 A1 | 11/2012 | Wade et al. |
| 2013/0007389 A1 | 1/2013 | Patterson et al. |
| 2013/0007753 A1 | 1/2013 | Jain |
| 2013/0046966 A1 | 2/2013 | Chu et al. |
| 2013/0086585 A1 | 4/2013 | Huang et al. |
| 2013/0104126 A1 | 4/2013 | Padmanabhuni et al. |
| 2013/0166831 A1 | 6/2013 | Atkisson et al. |
| 2013/0198459 A1 | 8/2013 | Joshi et al. |
| 2014/0181046 A1 | 6/2014 | Pawar et al. |
| 2014/0330784 A1 | 11/2014 | Sundaram et al. |
| 2014/0351636 A1 | 11/2014 | Yin et al. |
| 2015/0370483 A1 | 12/2015 | Schoebel-Theuer |
| 2016/0179839 A1 | 6/2016 | Sundaram et al. |
| 2016/0216896 A1 | 7/2016 | Sivasubramanian et al. |
| 2016/0253400 A1 | 9/2016 | McAlister |
| 2016/0328168 A1 | 11/2016 | Wei et al. |
| 2017/0031699 A1 | 2/2017 | Banerjee |
| 2017/0329528 A1 | 11/2017 | Wei et al. |
| 2018/0173874 A1 | 6/2018 | Muttik et al. |
| 2019/0124018 A1 | 4/2019 | Zhang |
| 2021/0157623 A1 | 5/2021 | Chandrashekar et al. |
| 2022/0164123 A1 | 5/2022 | Kim |
| 2023/0022729 A1 | 1/2023 | Ping et al. |

OTHER PUBLICATIONS

"AMI Basics" downloaded Jul. 11, 2013 from doc.aws.amazon.com/AWSEC2/latest/UserGuide/ComponentsAMIs.html, p. 1-2.

"AWS Amazon Elastic Block Store (EBS)—Persistent Storage" downloaded Jul. 11, 2013 from aws.amazon.com/ebs/, pp. 1-4.

"Cloudiquity" Published Mar. 12, 2009, Amazon Web Services and Cloud, pp. 1-4.

"Feature Guide: Elastic Block Store: Articles & Tutorials: Amazon Web Services" downloaded Jul. 11, 2013 from aws.amazon.com/articles/1667, pp. 1-7.

VMware; Carl Waldspurger; Memory Resource Management in WMware ESX Server; pp. 1-24, Dec. 10, 2002.

HP; Chris Hyser et al.; Autonomic Virtual Machine Placement in the Data Center; pp. 1-10, Feb. 26, 2008; HP Laboratories.

SwinBrain. "Database Management System Introduction". Nov. 17, 2009. Also available at http://swinbrain.ict.swin.edu.au/wiki/Database_Management_Systems_Introduction.

Amazon S3 Storage Services Guide—Developer Guide (API Version 2006-03-01 ). Can be accessed at <http://docs.aws.amazon.com/AmazonS3/latest/dev/Welcome.html>.

Reich et al. "VMTorrent: Scalable P2P Virtual Machine Streaming". Dec. 10-13, 2012.

* cited by examiner

MANAGEMENT OF OPERATING SYSTEM SOFTWARE USING READ-ONLY MULTI-ATTACH BLOCK VOLUMES

BACKGROUND

The ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability.

Figure 1:
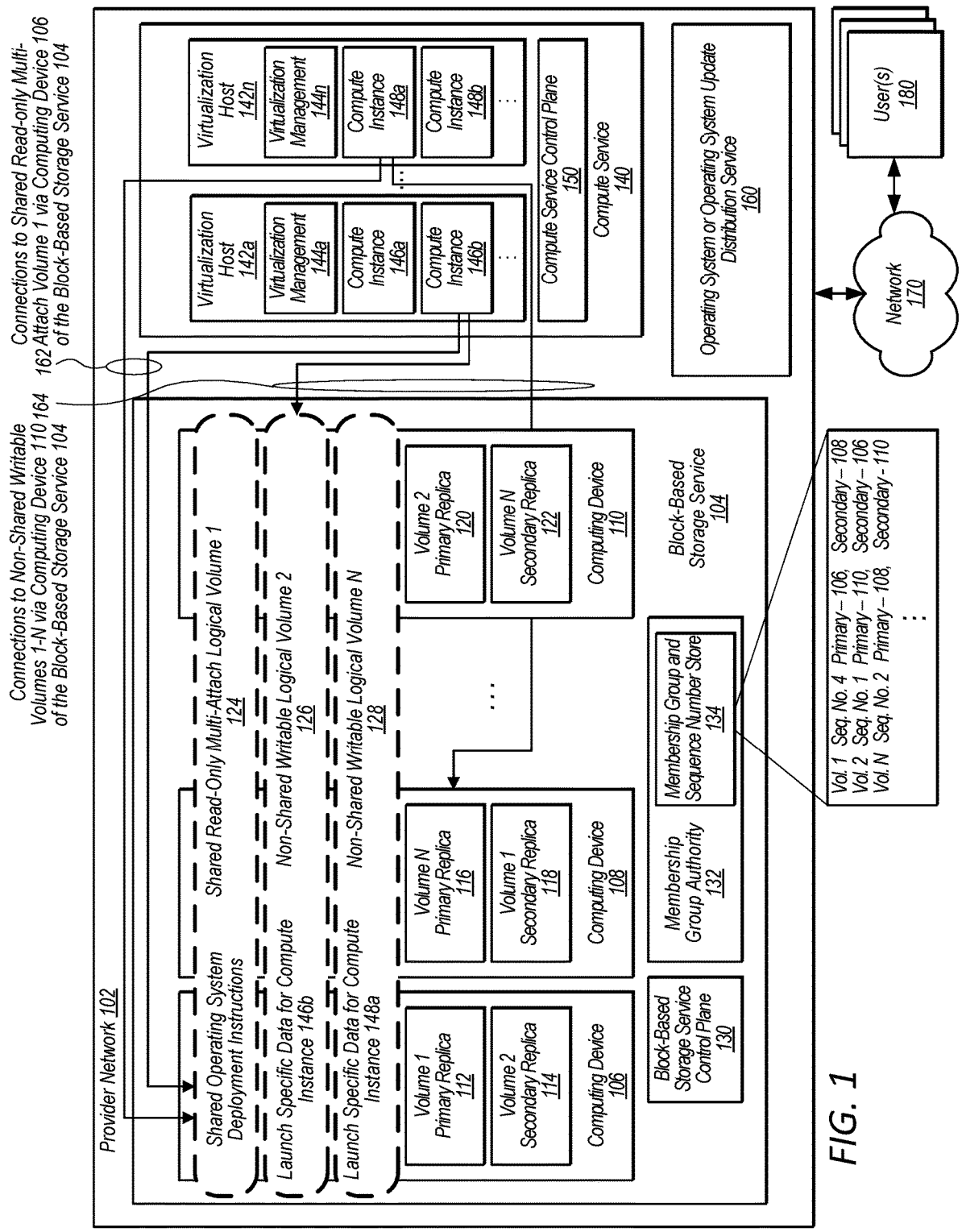
FIG. 1 is a block diagram illustrating a service provider network comprising a computing service, a block-based storage service, and an operating system/update distribution service, wherein the operating system/update distribution service causes shared read-only multi-attach volumes of the block-based storage service to be used to distribute operating systems or operating system updates to computing instances of the computing service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The present disclosure generally relates to a service that distributes an operating system software (which may include the full operating system, or just an update) to computing instances of a computing service, such as virtual machines offered by a cloud-based computing service. The distribution service uses shared read-only multi-attach volumes of a block-based storage service to distribute the operating system software to the computing instances, wherein a given read-only multi attach volume storing an operating system (or operating system update) is attached to multiple computing instances that share the single volume to launch the operating system (or perform the operating system update) on the respective computing instances. This process improves upon prior distribution schemes for distributing operating systems and operating system updates that involve providing individual non-shared copies of the full OS or OS update to each computing instance. For example, by allowing sharing of a read-only multi attach volume, storage demands are significantly reduced because a single copy of the operating system can be shared by multiple computing instances. As an example, instead of storing 10 copies of a 4-gigabyte operating system file (one for each of 10 computing instances), a single 4 gigabyte OS system file may be stored using a shared read-only multi-attach volume. Thus, in this example, storage overhead may be reduced from 40 gigabytes to 4 gigabytes.

Also, by restricting the shared multi-attach volume to only allowing read access (and therefore prohibiting writes), a higher degree of security may be achieved. For example, the possibility of modification of the OS boot volume is eliminated by restricting the volume type used for distribution to be read-only. As another example, using a read-only volume ensures that the OS distribution is tamper-proof and therefore cannot be tampered with by viruses or malware that may have infected already running instances. Said another way, if an instance that is to receive the OS is infected, it nevertheless cannot alter the OS boot volume, because the OS boot volume is read-only. This allows customers using the computing instances to be assured that they are receiving and using an un-modified OS that has not been tampered with by malware. For example, the customer can be assured that the compiler of the OS has been altered by malware.

In addition to allowing sharing of a single OS volume by using read-only multi attach volumes, reducing the contents of the OS volume to only those items needed for launch (or performance of an update) may further improve storage usage. For example, help-pages and/or other items not needed for OS launch or OS update may be segregated into other volumes that are attached on demand, but not necessarily provided unless demanded. As another example, debug pages could be segregated into their own volumes and attached on demand, but not necessarily provided unless demanded. Additionally, the OS (or OS update) may be divided up into a base version and separate add-ons. Thus, the shared read-only multi-attach volume may be "slimmer" by only including the base version of the OS and only the necessary add-ons. The OS add-ons are provided using other read-only multi-attach volumes. In this way, a given set of volumes attached to a computing instance may be selected in a tailored way to only provide a base version of the operating system along with selected add-ons, and without unnecessarily including launch data for other add-ons that are not to be launched on the computing instance. Also, in some embodiments, a customer may specify a certain number of add-on "type" features to be included in the base version volume, or at least some add-on features may be consolidated into add-on volumes, for example in order to keep a number of add-on volumes attached to a computing instance at a reasonable number.

In some embodiments, updates distributed using read-only multi-attach volumes may be distributed to running instances by attaching an additional volume to the running instance (e.g., the read-only multi-attach volume comprising the OS update). This may be performed using a "yum update" as an example. Also, for updates involving a reboot, the writable non-shared volume may be re-used, and only the read-only multi-attach volume may be swapped out to include the update. This simplifies the update process, because already written data is not lost during the update. In this way, the in-memory content and the on-disk content (e.g., on the writable volume) will not be out of synch.

In general, a volume, as discussed herein, can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing a computing instance to access either a primary replica of a volume or a secondary replica of the volume that is synchronized to the primary replica at a block level, such that a failure of either the primary or secondary replica does not inhibit access to the information of the volume. The role of the primary volume can be to facilitate reads and writes (sometimes referred to as "input output operations," or simply "I/O operations") at the volume for attached clients, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although many examples herein discuss a primary replica and a secondary replica, it will be appreciated that a logical volume can include multiple secondary replicas. Also, as discussed herein, some volumes may be limited to only accepting read requests and therefore may be read-only.

In some embodiments, a system includes a plurality of computing devices configured to implement a block-based storage system, wherein at least one of the computing devices is configured to implement a membership group authority for the block-based storage system. The computing devices of the block-based storage system store primary and secondary replicas of logical volumes or partitions of logical volumes hosted by the block-based storage system. In some embodiments, the block-based storage system may support two-way replication wherein data for a logical volume or logical volume partition is stored on two separate nodes, wherein one node stores a primary replica and another node stores a secondary replica. In some embodiments, a block-based storage system may support N-way replication, wherein one node stores a primary replica of data for a logical volume or logical volume partition and "N" additional nodes store "N" replicas of the data for the logical volume or the logical volume partition, wherein "N" is a number equal to or greater than two. In some embodiments, client computing devices, such as computing instances of a virtualized computing service, attach or connect to a virtual volume hosted by the block-based storage system such that the virtual volume that is implemented across multiple separate computing devices (e.g., storage hosts or nodes) of the block-based storage system appears to the client computing device as a locally attached storage device. For example, a logical volume may appear to a client computing device as being connected to the client computing device via an internet small computer system interface (iSCSI), in some embodiments.

A block storage service can allow users to create and attach persistent storage volumes to their virtual machines or other instances to store data. Multiple volumes may be attached to a single instance (e.g., virtual machine), and such a service can also include a multi-attach feature that enables users to attach a single volume to multiple instances (e.g., multiple virtual machines). Each instance to which this shared volume is attached can have full read permission, and users can manage (and set up policies to manage) which instances have write access.

In some embodiments, client computing devices may connect or attach to a logical volume via a first computing device (e.g., storage host or node) storing a primary replica of the logical volume or partition of the logical volume. In some embodiments, read requests and write requests may be serviced only by a computing device of the block-based storage system storing a primary replica and requests directed to a computing device storing a secondary replica may trigger a transition operation to be performed such that the computing device storing the secondary replica is converted into storing a primary replica. In some embodiments, the transition operation may comprise the computing device storing the secondary replica assuming a role of storing the primary replica and the computing device previously storing the primary replica assuming a role of storing the secondary replica. For example, the primary and secondary replicas may be "flipped." This may have the advantage of reducing or eliminating a need to re-mirror data to a new secondary replica as the previous primary replica will already have the data necessary to function as a secondary replica. In some embodiments, the transition operation may comprise promoting the secondary replica to primary replica, designating an additional node to store a replacement secondary replica, and re-mirroring volume data from the new primary replica to the replacement secondary replica.

Also, in some embodiments a block-based storage system may be configured to connect multiple client computing devices to a same logical volume at the same time. For example, the block-based storage system may be configured to connect a first client computing device to a logical volume of a plurality of logical volumes hosted by the block-based storage system, wherein the first client computing device connects to the logical volume via a first computing device of the block-based storage system storing a primary replica of the logical volume. The block-based storage system may also be configured to connect a second client computing device to the logical volume via the first computing device storing the primary replica of the logical volume, such that both the first client computing device and the second client computing device are connected to the logical volume at the same time via the first computing device storing the primary replica. Both the client computing devices concurrently connected to the logical volume may send read requests to read data from the logical volume.

Because multiple client computing devices may be connected or attached to a same logical volume implemented across multiple computing devices (e.g. nodes) of a block-based storage system at the same time, it may be necessary to ensure that both the client computing devices and computing devices of the block-based storage system hosting a replica (primary or secondary) of the logical volume are communicating with an up-to-date membership of a membership group of computing devices that are currently storing replicas (primary or secondary) for the logical volume. For example, when a secondary node (e.g., computing device storing a secondary replica) is promoted to be a primary node (e.g., computing device storing a primary replica), client computing devices need to direct reads to the promoted primary node (previous secondary node) and a previous primary node that has been superseded needs to cease to author reads in order to avoid supplying stale read data.

In some embodiments, in order to ensure up-to date membership is enforced a sequence number may be associated with each membership group and any changes in the membership of the membership group may cause a new updated sequence number to be authorized. For example, the loss of a primary node from a membership group, the promotion of a secondary node to a primary node, the addition of a secondary node, the loss of a secondary node, etc. may cause a new updated sequence number to be authorized.

In some embodiments, a membership group authority of a block-based storage service may maintain a store storing a latest authorized sequence number for a given logical volume or logical volume partition along with membership information for a membership group associated with the latest authorized sequence number. Each member of the membership group may be provided the latest authorized sequence number and may locally store the latest authorized sequence number provided to the respective member of the membership group (e.g., computing device or node storing a primary or secondary replica). Also, communications between the members of the membership group may include a latest authorized sequence number known by the member authoring the communication. Members of the membership group may compare a sequence number included in a communication to a locally stored latest authorized sequence number to ensure the sender and receiver of the communication are on the same sequence number (e.g., neither node has become stale). Also, a primary node may seek verification from secondary nodes of a membership group that the secondary nodes are on the same sequence number as the primary node when responding to a communication.

In some embodiments, a system, such as may be included in a service provider network, includes computing devices configured to implement a computing service. For example, a computing service may implement virtual machines. Also, the system includes computing devices configured to implement a block-based storage service that provides block-storage volumes that can be attached to the computing instances and which may appear to the computing instances as local storage, such as a virtualized hard drive. Additionally, the system includes computing devices configured to implement an operating system and/or operating system update service. For example, as part of launching a computing instance a boot volume of an operating system may be provided to the computing instance, also updates to an operating system executing on a computing instance may be distributed using the operating system and/or operating system update distribution service. Instructions for deployment of a given operating system (OS) or OS update may be provided by a control plane of the computing service and/or a customer of the computing service may indicate an OS version or OS update version to be deployed on a given instance. In response to an instruction to distribute an OS or OS update, the operating and/or operating system update distribution service causes a shared read-only multi-attach volume to be attached to computing instances that are to receive the OS or the OS update. For example, a given request may indicate that the OS or OS update is to be distributed to multiple computing instances, or multiple requests may be received that each request distribution of a given OS or OS update. In either circumstance, a shared read-only multi-attach volume may be attached to the recipient computing instances in order to distribute the OS or OS update. More specifically, the block-based storage service is configured to provide a shared read-only multi-attach volume for attachment to a set of computing instances to receive deployment of a given operating system or a given operating system update and to provide separate respective non-shared writable volumes for attachment to the respective computing instances of the set. Also, when the OS install or the OS update are executed, read operations are performed on the shared read-only multi-attach volume to deploy the given operating system, or the given operating system update, to the set of computing instances and write operations invoked as part of deploying the given operating system, or the given operating system update, are written to the respective non-shared writeable volumes.

In some embodiments, the OS install package or the OS update being distributed may be formatted such that read requests are directed to the shared read-only multi-attach volume and write request are directed to the non-shared writable volume. However, in other embodiments, a non-modified OS install package or OS update may be distributed and a read-write re-direct agent (e.g., update agent) may be implemented to direct read requests issued by the OS install package or the OS update to the shared read-only multi-attach volume and to direct write operations to the non-shared writable volume. However, note that when appropriate read requests may also be directed to the non-shared writable volume, such as to read launch specific data previously written.

FIG. 1 is a block diagram illustrating a service provider network comprising a computing service, a block-based storage service, and an operating system/update distribution service, wherein the operating system/update service causes shared read-only multi-attach volumes of the block-based storage service to be used to distribute operating systems or operating system updates to computing instances of the computing service, according to some embodiments.

Provider network 102 includes a block-based storage service 104 that supports multi-attach volumes and includes an operating system or operating system update distribution service 160 (herein referred to as distribution service 160), according to some embodiments. The provider network 102 can be a cloud provider network, or "cloud," which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

In some embodiments, provider network 102 includes block-based storage service 104, and a plurality of client computing devices, such as compute instances 146 and 148, wherein computing instances 146b and 148a are attached to one or more logical volumes implemented by the block-based storage service 104, such as shared read-only multi-attach logical volume 1 (124), non-shared writable logical volume 2 (126) (attached to computing instance 146b), and non-shared writable logical volume N (128) (attached to computing instance 148a). The compute instances 146 and 148, can perform I/O operations using clients to establish connections with, and handle I/O to, remote volumes (e.g., volumes accessed over a network). A client may be implemented on an offload card of a server that includes the processing units (e.g., CPUs or GPUs) of a compute instance. In some embodiments, a block-based storage service may include any number of computing devices, such as computing devices 106 and 108 through 110 that include physical storage devices used to store replicas for any number of logical volumes, or partitions, thereof, hosted by the block-based storage service. Also, in some embodiments, an offload card of a server may enforce read-only policies of multi-attach volumes, such as shared read-only multi-attach logical volume 1 (124). For example, at the network level the offload card may block write operations from being applied to volume 124 by attached computing instances, such as computing instances 146b and 148a.

In some embodiments, an offload card of a server implementing compute instance, such as compute instances 146 and 146, may read instructions for launching or updating an operating system from an additional storage service of the provider network 102. For example, in some embodiments, an offload card may retrieve read-only instructions for distribution to computing instances from a file storage system, object-based storage system, etc. as an additional source for OS updates and/or in combination with the block-based storage system 102 shown in FIG. 1.

In some embodiments, a provider network may perform compute services, storage services, networking services, and/or other services for users of the provider network. For example, user computing devices 180 are connected to provider network 102 via network 170 and may be users or clients of the provider network that includes the block-based storage service 104. In some embodiments, users may be provisioned client computing devices of a provider network, such as portions of computing devices that implement computing instances 146 and 148. Furthermore, a logical volume may be provisioned for use by a user and attached to the user's computing instance. For example, client applications running on compute instances 146 and 148 are connected via connections 162 to logical volume 1 (124) via computing device 106 hosting primary replica 112 of logical volume 1 (124). Also, client applications running on compute instance 146 are attached to non-shared writable volume 2 (126) via computing device 110 hosting primary replica 120.

In some embodiments, each logical volume may be implemented via multiple replicas stored on multiple separate computing devices. In some embodiments, different replicas of a logical volume may be stored by computing devices in different data centers, different availability zones, etc. For example, these different storage locations may reduce the likelihood of correlated failures of replicas for a logical volume such as due to a power failure, a network failure, etc. In some embodiments, a primary and a secondary replica may be stored for each logical volume, or partition thereof, by a different computing device in a different data center, availability zone, etc. Also, in some embodiments, "N" replicas may be stored for each logical volume, or partition thereof, by three or more different computing devices in three or more different data centers, availability zones, etc. of a provider network, such as provider network 102.

For example, logical volume 1 (124) is implemented via computing device 106 storing primary replica 112 and computing device 108 storing secondary replica 118. Also, logical volume 2 (126) is implemented via computing device 110 storing primary replica 120 and computing device 106 storing secondary replica 114. Additionally, a block-based storage service, such as block-based storage service 104, may support any number of additional logical volumes "N." As another example, logical volume "N" (128) is implemented via computing device 108 storing primary replica 116 and computing device 110 storing secondary replica 122. In some embodiments, computing devices 106, 108, and 110 may be located in different failure impact zones, such as different racks within a computing room, different computing rooms within a data center, different data centers within an availability zone, or in different availability zones of a provider network, as a few examples.

In addition, block-based storage service 104 may include a block-based storage service control plane, such as block-based storage service control plane 130. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The block-based storage service control plane may determine placement of a logical volume on a given set of computing devices or may work with a computing device during a failover to identify a computing device to host a replacement replica. In some embodiments, a block-based storage service control plane, such as block-based storage service control plane 130, may balance IO load, data storage requirements, etc. when selecting computing devices to host a primary or a secondary replica of a logical volume. In some embodiments, a block-based storage service control plane, such as block-based storage control plane 130, may perform other management tasks for managing the block-based storage service such as those further described herein.

In some embodiments, a block-based storage service, such as block-based storage service 104, may further include a membership group authority, such as membership group authority 132. In some embodiments, the membership group authority may authorize, or decline to authorize, proposed new sequence numbers for an associated membership group based on whether or not the proposed sequence number is a next sequence number in a sequence that has not yet been authorized for a logical volume, or partition thereof. In some embodiments, a sequence number may be represented by a 64-bit number. In some embodiments, a sequence number may be a monotonically increasing integer, wherein each successive sequence number is greater than a previous sequence number by "1." In some embodiments, a membership group authority, such as membership group authority 132, includes a membership group and sequence number store, such as membership group and sequence number store 134. In some embodiments, a membership group and sequence number store stores a greatest sequence number and associated membership group information for each logical volume, or partition thereof, hosted by a block-based storage service, such as block-based storage service 104.

For example, membership group and sequence number store 134 stores a sequence number of "4" for logical volume 1 along with associated membership group information indicating that for sequence number "4" computing device 106 is the primary node storing primary replica 112 and computing device 108 is the secondary node storing secondary replica 118. Additionally, membership group and sequence number store 134 stores a sequence number of "1" for logical volume 2 along with associated membership group information indicating that for sequence number "1" computing device 110 is the primary node storing primary replica 120 of logical volume 2 and computing device 106 is the secondary node storing secondary replica 114 of logical volume 2. Also, membership group and sequence number store 134 stores a sequence number of "2" for logical volume N along with associated membership group information indicating that for sequence number "2" computing device 108 is the primary node storing primary replica 116 of logical volume N and computing device 110 is the secondary node storing secondary replica 122 of logical volume N.

In some embodiments, all members of a membership group for a logical volume, or partition thereof, locally store a latest sequence number and associated membership group information for a logical volume for a replica stored on the respective computing device of the block-based storage service. For example, computing device 106 of block-based storage service 104 locally stores a latest sequence number and membership group information for logical volumes 1 and 2. Also, computing device 108 locally stores a latest sequence number and membership group information associated with the latest sequence number for logical volumes 1 and N. Additionally, computing device 110 locally stores a latest sequence number and membership group information associated with the latest sequence number for logical volumes 2 and N. The locally stored latest authorized sequence numbers are the latest sequence numbers for the given logical volume that have been seen by the respective computing device locally storing the respective sequence number. However, a situation may arise wherein a new sequence number that is larger (and later) than a locally stored sequence number has been authorized by a membership group authority, such as membership group authority 132, but has not yet been received or seen by a given computing device storing an out-of-date locally stored sequence number. Additionally, each client computing device connected to a given logical volume may locally store a latest sequence number for the logical volume. For example, each of client computing devices 146 and 148 locally store sequence number 4 and associated membership group information for logical volume 1 (124) to which client computing devices 146 and 148 are connected.

In some embodiments, communications between nodes hosting a given logical volume, such as between computing devices 106 and 108 each hosting a replica of logical volume 1 (124) may include a latest sequence number locally stored by the entity sending the communication. An entity receiving the communication may verify that the sequence number included with the communication matches a locally stored sequence number and may further seek verification that the sequence number included with the communication matches sequence numbers locally stored by other members of the membership group, such as computing devices storing secondary replicas for the same logical volume. In some embodiments, agreement between primary and secondary nodes is a prerequisite for performing IO, such as reads. By enforcing sequence number agreement, reads from a stale primary node may be avoided.

In some embodiments, a block-based storage service, such as block-based storage service 104, may be implemented in an asynchronous network environment, meaning that messages between nodes of the asynchronous network may be delayed or delivered out of order. However, as briefly discussed above and discussed in more detail below, enforcement of sequence number agreement may prevent reads from a stale primary node is such an asynchronous network environment. In some embodiments, a primary node may verify that secondary nodes locally store sequence numbers matching a sequence number locally stored by a primary node performing a read. These verifications may be satisfied before the primary node sends the requested read data to the client computing device requesting the read.

This specification continues with a general description of a provider network, which may implement multi-attach logical volumes of a block-based storage service that are accessed by virtual compute instances offered by a virtual compute service.

Provider network 102 may be set up by an entity such as a company or a public sector organization to provide one or more services (such as various types of cloud-based computing or storage) accessible via the Internet and/or other networks to users 210. Provider network 102 may include numerous data centers hosting various resource pools, such as collections of physical and/or virtualized computer servers, storage devices, networking equipment and the like (e.g., computing system 1300 described below with regard to FIG. 13), needed to implement and distribute the infrastructure and services offered by the provider network 102. In some embodiments, provider network 102 may provide computing resources, such as virtual compute service 200, storage services, such as block-based storage service 104, and/or any other type of network-based services. Users 180 may access these various services offered by provider network 102 via network 170. Likewise, network-based services may themselves communicate and/or make use of one another to provide different services. For example, computing resources offered to users 180 in units called "instances," such as virtual or physical compute instances, may make use of particular logical data volumes, such as logical volume 1 (124), logical volume 2 (126), logical volume N (128), etc., providing virtual block-based storage for the compute instances.

As noted above, virtual compute service 140 may offer various compute instances, such as compute instances 146a, 146b, 148a, and 148b to users 180. In some embodiments, uses 180 may be internal users of the service provider network 102. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 140 in different embodiments, including special purpose computer servers, storage devices, network devices and the like. In some embodiments instance users 180 or any other user may be configured (and/or authorized) to direct network traffic to a compute instance. In various embodiments, compute instances may mount, connect, attach or map to one or more data volumes, such as logical volume 1 (124), logical volume 2 (126), logical volume N (128) provided by block-based storage service 104 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the user 180 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

As illustrated in FIG. 1, a virtualization host, such as virtualization hosts 142a and 142n, may implement and/or manage multiple compute instances 146a, 146b, 148a, and 148b respectively, in some embodiments, and may be one or more computing devices, such as computing system 1300 described below with regard to FIG. 13. Virtualization hosts 142 may also provide multi-tenant hosting of compute instances. For example, in some embodiments, one virtualization host may host a compute instance for one entity (e.g., a particular client or account of virtual computing service 140), while another compute instance hosted at the same virtualization host may be hosted for another entity (e.g., a different account). A virtualization host may include a virtualization management module, such as virtualization management modules 144a and 144n capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 140 may implement control plane 150 to perform various management operations. For instance, control plane 150 may implement resource management to place compute instances, and manage the access to, capacity of, mappings to, and other control or direction of compute instances offered by provider network. Control plane 150 may provide both a direct sell and $3^{rd}$ party resell market for capacity reservations (e.g., reserved compute instances). For example, control plane 150 may allow users 180 to learn about, select, purchase access to, and/or reserve capacity for computing resources, either from an initial sale marketplace or a resale marketplace, via a web page or via an API. For example, control plane 150 may provide listings of different available compute instance types, each with a different credit accumulation rate. Control plane 150 may also offer and/or implement a flexible set of resource reservation, control and access interfaces for users 180 via an interface (e.g., API). For example, control plane 150 may provide credentials or permissions to users 180 such that compute instance control operations/interactions between clients and in-use computing resources may be performed.

In various embodiments, control plane 150 may track the consumption of various computing instances consumed for different virtual computer resources, clients, user accounts, and/or specific instances. In at least some embodiments, control plane 150 may implement various administrative actions to stop, heal, manage, or otherwise respond to various different scenarios in the fleet of virtualization hosts 142 and instances 146, 148. Control plane 150 may also provide access to various metric data for client(s) 180 as well as manage client configured alarms. In various embodiments, control plane 150 may implement billing management. Control plane 150 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

In various embodiments, provider network 102 may also implement block-based storage service 104 for performing storage operations. Block-based storage service 104 is a storage system, composed of a pool of multiple independent resource hosts, such as computing devices 106 through 110 (e.g., server block data storage systems), which provide block level storage for storing one or more sets of data volumes, such as logical data volume(s) 1 (124) through "N" (128). Data volumes may be attached, mounted, mapped, or otherwise connected to particular client computing devices (e.g., a virtual compute instance of virtual compute service 140), providing virtual block-based storage (e.g., hard disk storage or other persistent storage) as a contiguous set of logical blocks. In some embodiments, a logical data volume may be divided up into multiple data chunks or partitions (including one or more data blocks) for performing other block storage operations, such as snapshot operations or replication operations. A volume snapshot of a data volume may be a fixed point-in-time representation of the state of the data volume. In some embodiments, volume snapshots may be stored remotely from a storage host maintaining a data volume, such as in another storage service of a provider network (not shown). Snapshot operations may be performed to send, copy, and/or otherwise preserve the snapshot of a given data volume in another storage location, such as a remote snapshot data.

Block-based storage service 104 may implement block-based storage service control plane 130 to assist in the operation of block-based storage service 104. In various embodiments, block-based storage service control plane 130 assists in managing the availability of block data storage to clients, such as programs executing on compute instances provided by virtual compute service 200 and/or other network-based services located within provider network 102 and/or optionally computing systems (not shown) located within one or more other data centers, or other computing systems external to provider network 102 available over a network 170. Access to data volumes may be provided over an internal network within provider network 102 or externally via network 170, in response to block data transaction instructions.

Block-based storage service control plane 130 may provide a variety of services related to providing block level storage functionality, including the management of user accounts (e.g., creation, deletion, billing, collection of payment, etc.). Control plane 130 may implement capacity management, which may generate and manage a capacity model for block-based storage service 104, and may direct the performance of responsive actions based on the capacity of block-based storage service 104. Block-based storage service control plane 130 may further provide services related to the creation, usage and deletion of data volumes in response to configuration requests. Block-based storage service control plane 130 may also provide services related to the creation, usage and deletion of volume snapshots on other storage services. Block-based storage service control plane 130 may also provide services related to the collection and processing of performance and auditing data related to the use of data volumes and snapshots of those volumes.

Users 180 may encompass any type of client configurable to submit requests to provider network 102. For example, a given client 180 may include a suitable version of a web browser, or may include a plug-in module or other type of code module configured to execute as an extension to or within an execution environment provided by a web browser. Alternatively, a client 180 may encompass an application such as a database application (or user interface thereof), a media application, an office application or any other application that may make use of compute instances, a logical data volume, or other network-based service in provider network 102 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, users 180 may be configured to generate network-based services requests according to a Representational State Transfer (REST)-style network-based services architecture, a document- or message-based network-based services architecture, or another suitable network-based services architecture. In some embodiments, a client 180 (e.g., a computational client) may be configured to provide access to a compute instance or a logical data volume in a manner that is transparent to applications implement on the client 180 utilizing computational resources provided by the compute instance or block storage provided by the logical data volume.

Users 180 may convey network-based service requests to provider network 102 via external network 170. In various embodiments, external network 170 may encompass any suitable combination of networking hardware and protocols necessary to establish network-based communications between users 180 and provider network 102. For example, a network 170 may generally encompass the various telecommunications networks and service providers that collectively implement the Internet. A network 170 may also include private networks such as local area networks (LANs) or wide area networks (WANs) as well as public or private wireless networks. For example, both a given client 180 and provider network 102 may be respectively provisioned within enterprises having their own internal networks. In such an embodiment, a network 170 may include the hardware (e.g., modems, routers, switches, load balancers, proxy servers, etc.) and software (e.g., protocol stacks, accounting software, firewall/security software, etc.) necessary to establish a networking link between given client 180 and the Internet as well as between the Internet and provider network 102. It is noted that in some embodiments, users 180 may communicate with provider network 102 using a private network rather than the public Internet.

In some embodiments, multiple resource hosts, such as computing devices 106, 108, and 110, may be implemented in order to provide block-based storage services. A resource host may be one or more computing systems or devices, such as a storage server or other computing system (e.g., computing system 1300 described below with regard to FIG. 13). Each resource host may maintain respective replicas of logical volumes, or partitions thereof. Some logical volumes may differ in size from other logical volumes, in some embodiments. Resource hosts may also provide multi-tenant storage. For example, in some embodiments, one resource host may maintain a replica of a logical volume for one account of block-based storage service 104, while another logical volume replica is maintained at the same resource host, which may be maintained for a different account. Resource hosts, such as computing devices 106, 108, and 110, may persist their respective logical volume replicas in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 104 may manage and maintain logical volume replicas in a variety of different ways. Different durability schemes may be implemented for some logical volumes among two or more resource hosts as a distributed resource maintaining a same replica of a logical volume at different partitions of the logical volume. For example, different types of mirroring and/or replication techniques may be implemented (e.g., RAID 1) to increase the durability of logical volume, such as by eliminating a single point of failure for a logical volume. In order to provide access to a logical volume, resource hosts may then coordinate I/O requests (e.g., input/output requests), such as write requests, among the two or more resource hosts maintaining a replica of a data volume. For example, for a given data volume, one resource host may serve as a primary resource host (e.g., primary node). A primary resource host may, in various embodiments, receive and process requests (e.g., I/O requests) from clients of the logical volume. Thus, the primary resource host may then coordinate replication of I/O requests, such as write requests, or any other changes or modifications to the logical volume to one or more other resource hosts serving as secondary resource hosts (e.g., secondary nodes). Thus, when a write request is received for the logical volume at a primary resource host, the primary resource host may forward the write request to the secondary resource host(s) and wait until the secondary resource host(s) acknowledges the write request as complete before completing the write request at the primary resource host.

Please note, that in some embodiments, the role of primary and secondary resource hosts may be assigned per logical volume. For example, for a logical volume maintained at one resource host, the resource host may serve as a primary resource host. While for another logical volume maintained at the same resource host, the resource host may serve as a secondary resource host. Resource hosts may implement respective I/O managers. The I/O managers may handle I/O requests directed toward logical volumes maintained at a particular resource host. Thus, I/O managers may process and handle a write request to a logical volume replica at a resource host, for example. I/O managers may be configured to process I/O requests according to a block-based storage service application programming interface (API) and/or other communication protocols, such as such as internet small computer system interface (iSCSI). Primary resource hosts may direct other operations for logical volumes, like snapshot operations or other I/O operations (e.g., serving a read request). In some embodiments, I/O managers of resource host(s) may allocate processing capacity to provide access to data volumes stored at resource host(s), such as by allocating IOPS, throughput, or other resources, to provide specified performance for data volumes.

Resource hosts may be located within different infrastructure localities. Infrastructure localities may be defined by devices, such as server racks, networking switches, routers, or other components, power sources (or other resource host suppliers), or physical or geographical locations (e.g., locations in a particular row, room, building, data center, fault tolerant zone, etc.). Infrastructure localities may vary in scope such that a resource host (and replicas of data volumes implemented on the resource host) may be within multiple different types of infrastructure localities, such as a particular network router or brick, a particular room location, a particular site, etc.

In at least some embodiments, control plane 130 may implement host data collection to collect information, metrics, metadata, or any other information for performing volume creating or managing logical volumes. Host data collection may periodically sweep resource host(s) (e.g., computing devices 106 through 110) with a query for information, metrics, or metadata. For example, resource hosts may provide current utilization metrics, ongoing tasks or operations (e.g., such as migration or remirror tasks), and any other state information for the resource host, including volume specific information for volume replicas residing at the resource hosts. In some embodiments, host data collection may aggregate the data according to infrastructure localities, partitions, resource hosts, or other granularities for block-based storage service 104. Host data collection may store the data at volume state store, which may persistently maintain the collected data. In some embodiments, a volume state store may be implemented as a database or otherwise searchable/query-able storage system to provide access to other components of control plane 130.

Control plane 130 may implement connection management to direct the establishment of a connection between logical volumes and other client resources, such as an instance or client computing device. For example, a connection request may be received for a virtual compute instance. Connection management may notify a creation engine to create a logical volume to be connected to the virtual compute instance. Connection management may generate the necessary credentials (e.g., tokens, lease identifiers, or keys) to provide to the virtual compute instance, as well as notify the resource host(s) that will host a primary replica of the created logical volume of the virtual compute instances access rights. In at least some embodiments, resource host(s) may restrict access to a created data volume to those client resources that are identified according to the provided credentials.

In some embodiments, operating system or operating system update distribution service 160 (hereinafter distribution service 160) may distribute operating system machine images or operating system updates to computing instances such as computing instances 146*a*, 146*b*, 148*a*, and 146*b*, etc. For example, shared read-only multi-attach volume 124 is attached to both computing instance 146*b* and 148*a*. Also, non-shared writable volume 126 is attached to computing instance 146 *b* and non-shared writable volume 128 is attached to computing instance 148*b*. As discuss in more detail in FIGS. 2-5 these attached volumes can be used to distribute operating systems, such as the Linux operating system for use in booting the computing instances 146*b* and 148*a*. Additionally, these attached volumes can be used to distribute operating system updates to the computing instances 146*b* and 148*a*.

Figure 2:
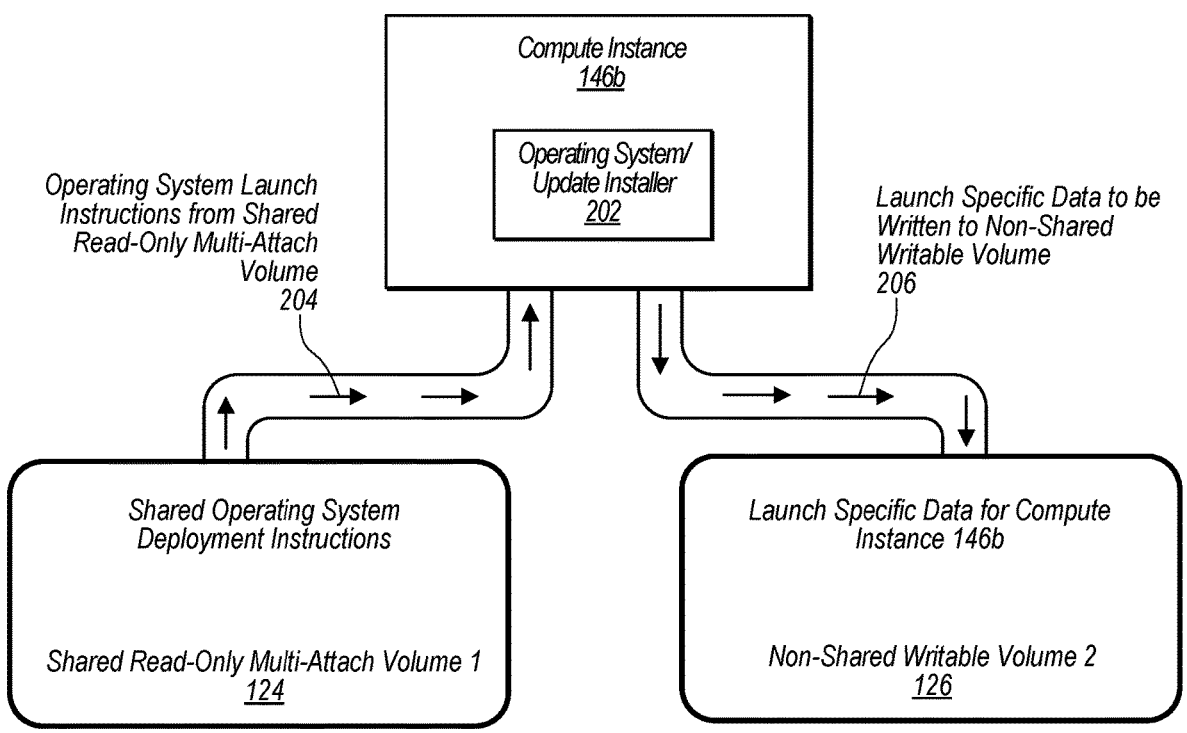
FIG. 2 is a block diagram illustrating information used in installing an operating system or operating system update being read from an attached shared read-only multi-attach volume, while launch specific data is written to an attached non-shared writable volume, according to some embodiments.

FIG. 2 is a block diagram illustrating information used in installing an operating system or operating system update being read from an attached shared read-only multi-attach volume, while launch specific data is written to an attached non-shared writable volume, according to some embodiments. For example, as shown in FIG. 2, operating system (or update) installer 202 of computing instance 146*b* may receive operating system launch instructions (or update instructions) 204 from shared read-only multi-attach volume 1 (124) and may write launch specific data 206 to non-shared writable volume 2 (126). For example, in the embodiments, shown in FIG. 2, the OS update installer 202 may be configured to automatically segregate reads and writes, such that read operations for reading the launch instructions are directed to shared read-only multi-attach volume 1 (124) and writes are directed to non-shared writable volume 2 (126). As an example, in Linux, a file system hierarchy standard is used to separate out user specific information (addressable using: "/user"). Also, logs and variables are separated out using "/log" and "/var" file system hierarchies. In some embodiments, the operating system update installer 202 is configured to implement these file system hierarchies (the ones that include launch specific information, such as "/user", "/log", and "/var") on the non-shared writable volume 2 (126), while other non-launch specific file system hierarchies are implemented from the shared read-only multi-attach volume 1 (124).

Figure 3:
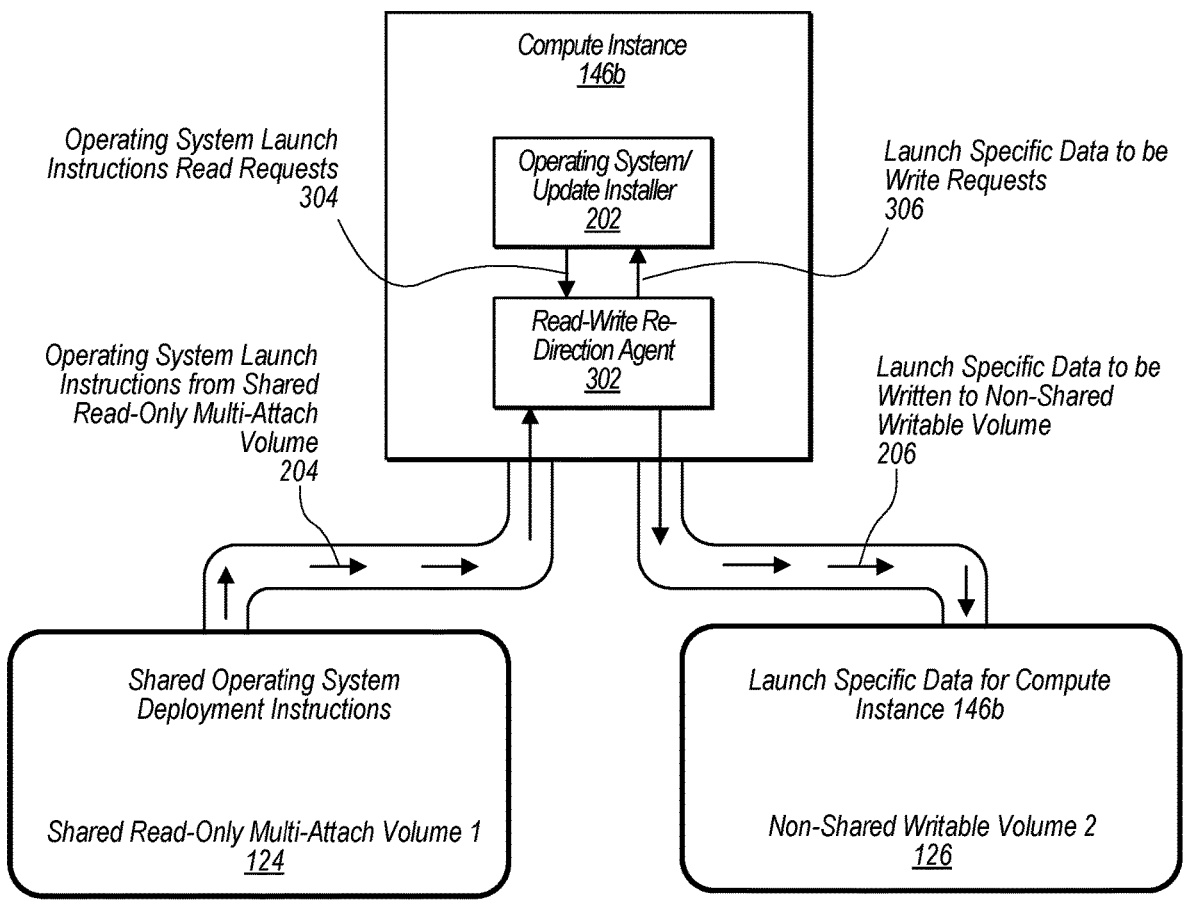
FIG. 3 is a block diagram illustrating a read-write re-direction agent implemented at a computing instance, wherein the read-write re-direction agent re-directs reads to the shared multi-attach volume and re-directs writes to the non-shared writable volume, according to some embodiments.

However, in some embodiments, a re-direct may be used. For example, FIG. 3 is a block diagram illustrating a read-write re-direction agent implemented at a computing instance, wherein the read-write re-direction agent re-directs reads to the shared multi-attach volume and re-directs writes to the non-shared writable volume, according to some embodiments. For example, the read-write re-direct agent 302 may be implemented using a kernel module or virtual private server module implemented on the compute instance 202. In such an embodiment, operating system update installer 202 may issue read requests to receive operating system instructions (304) and write requests to write launch specific data 306 as if communicating with a single attached volume. In turn, read-write redirection agent 302 may segregate the traffic 304 to be directed to shared read-only multi-attach volume 1 (124) and the traffic 306 to be directed to non-shared writable volume 2 (126).

Figure 4:
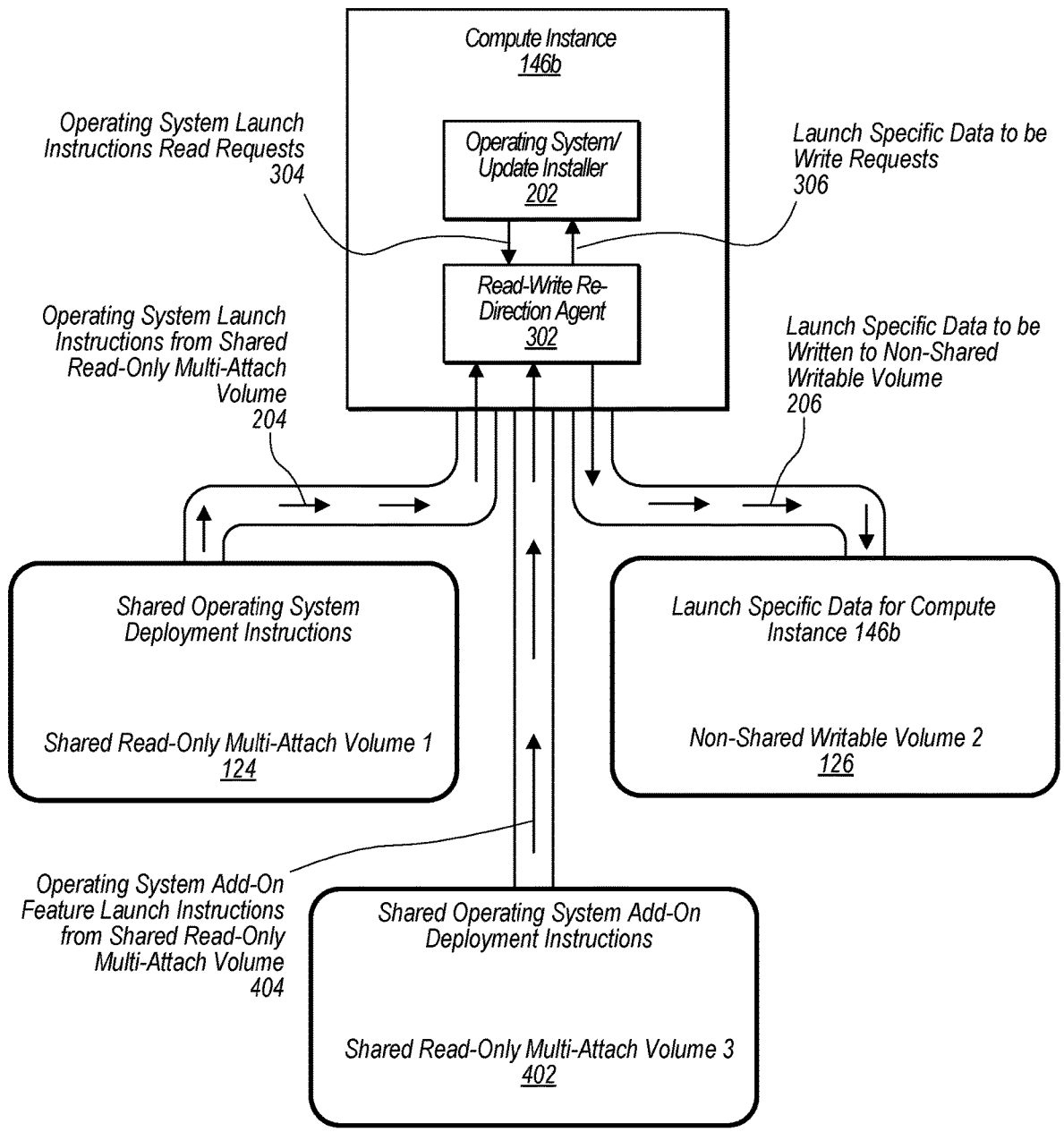
FIG. 4 is a block diagram illustrating a set of sharable read-only multi-attach volumes attached to a computing instance, as well as a non-shared writable volume attached to the computing instance, wherein a first one of the shared volumes includes a base version of an operating system or operating system update being installed on the computing instance and the second one of the shared volumes includes additional add-ons that customize the operating system or the operating system update being installed on the computing instance, for example for a particular use by the computing instance, according to some embodiments.

Also, in some embodiments, more than one shared volume may be used to distribute an operating system or operating system update. For example, FIG. 4 is a block diagram illustrating a set of sharable read-only multi-attach volumes attached to a computing instance, as well as a non-shared writable volume attached to the computing instance, wherein a first one of the shared volumes includes a base version of an operating system or operating system update being installed on the computing instance and the second one of the shared volumes includes additional add-ons that customize the operating system or the operating system update being installed on the computing instance, for example for a particular use by the computing instance, according to some embodiments. More specifically, both shared read-only multi-attach volume 1 (124) and shared read-only multi-attach volume 3 (402) are attached to computing instance 146*b*. General instructions for OS launch (or update) are read from volume 124 while instructions for implementing customization (e.g., the addition of add-on features) are read from volume 402 as operating system add-on feature launch instructions 404.

It should be noted that in some embodiments, customized operating systems and/or updates may be achieved by mixing and matching various combinations of add-on feature volumes that are overlay attached to a computing instance along with a volume storing base OS instructions. For example, while only a single add-on feature volume is shown attached in FIG. 4, in some embodiments multiple such add-on feature volumes may be attached.

In some embodiments, an on-line update may be performed by attaching an add-on volume to a computing instance, such as computing instance 146*b*, to augment a base OS volume, such as may be included in shared read-only multi-attach volume 1 (124). For example, add-on shared read-only multi-attach volume 3 (402) may provide an update to the OS stored in shared read-only multi-attach volume 1 (124), that enables the OS to be updated without requiring a re-boot. However, in such circumstances, when a re-boot is triggered (for example for other reasons), the base OS volume (such as included in shared read-only multi-attach volume 1 (124)) may be replaced with an updated base OS volume that includes the updates, such that after the re-boot it is no longer necessary to also attach the add-on shared read-only multi attach volume 3 (402). This is because the updates included in the add-on volume have been incorporated into the updated base OS volume.

Figure 5:
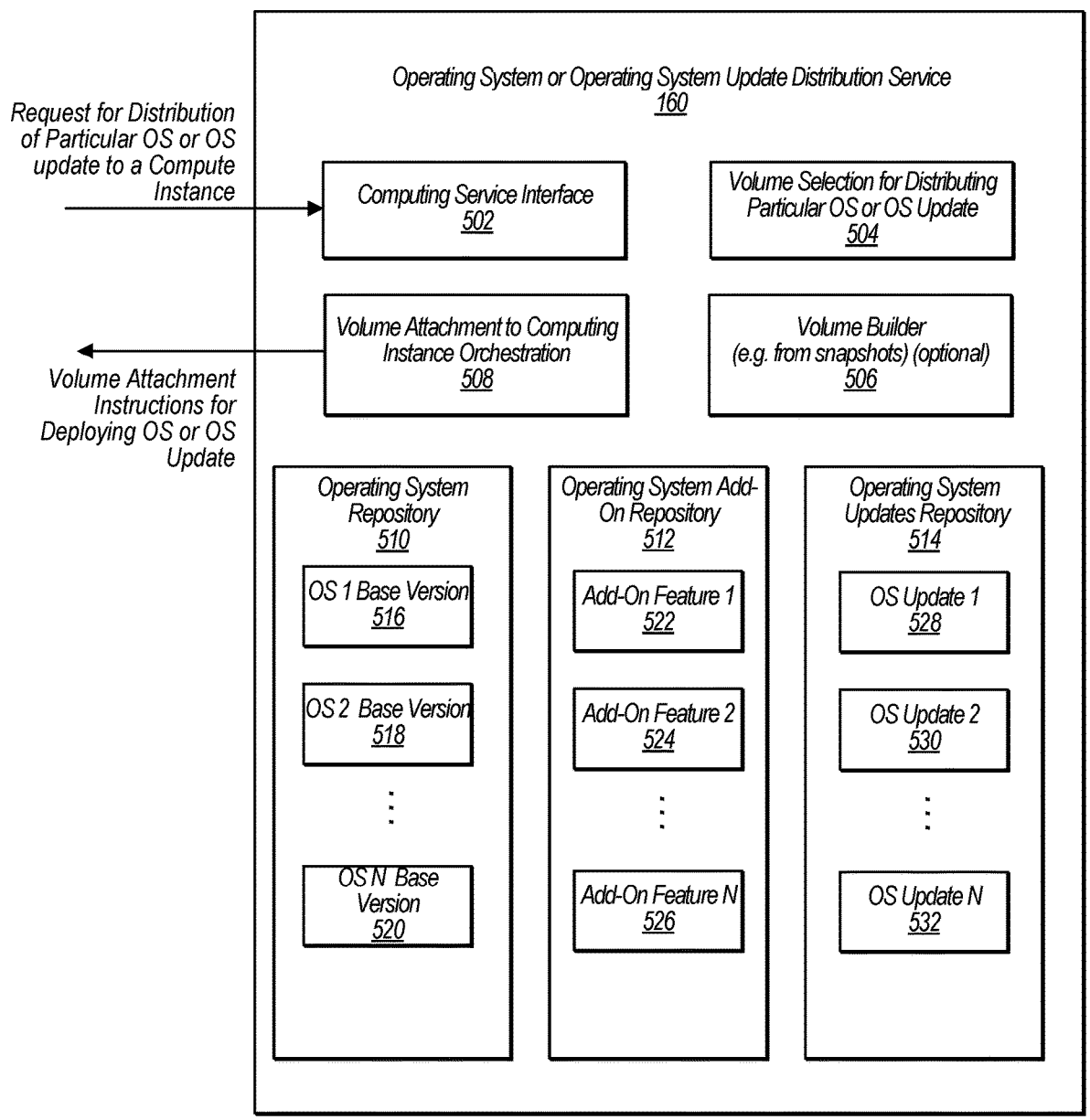
FIG. 5 is a block diagram illustrating additional components that may be included in an operating system or operating system update distribution service, according to some embodiments.

FIG. 5 is a block diagram illustrating additional components that may be included in an operating system or operating system update distribution service, according to some embodiments.

In some embodiments, distribution service 160 includes a computing service interface 502. For example, a customer may select an operating system or operating system update via a console of a computing service, such as computing service 140, and the computing service may forward OS distribution instructions to the distribution service 160 via interface 502. Also, the distribution service 160 includes volume selection module 504. For example, the distribution service may determine a combination of attachable volumes that are needed to install a given version of an operating system. For example, operating system repository 510 includes different base OS versions that may be selected such as OS1 base version (516), OS 2 base version (518) through OSN base version (520). Also, various feature add-ons may be installed along with a given OS base version, such as any of add-on features 522, and 524 through 526 included in operating system add-on repository 512. Also, in some embodiments, a separate repository 514 may be included for OS updates, such as OS updates 528, and 530 through 532. In some embodiments, shared read-only multi-attach volumes may include operating instructions from any of the repositories 510, 512, or 514. Also, in some embodiments, volume builder 506 may build read-only multi-attach volumes to include selected instructions from a given one of the repositories. In some embodiments, this may take the form of building a volume using stored snapshots, such as may be stored in another service of the service provider network 102, such as an object-based storage service of the service provider network 102. Finally, volume attachment orchestration module 508 may cause the populated multi-attach volumes to be attached to respective computing instances in order to distribute an operating system or an operating system update.

Figure 6:
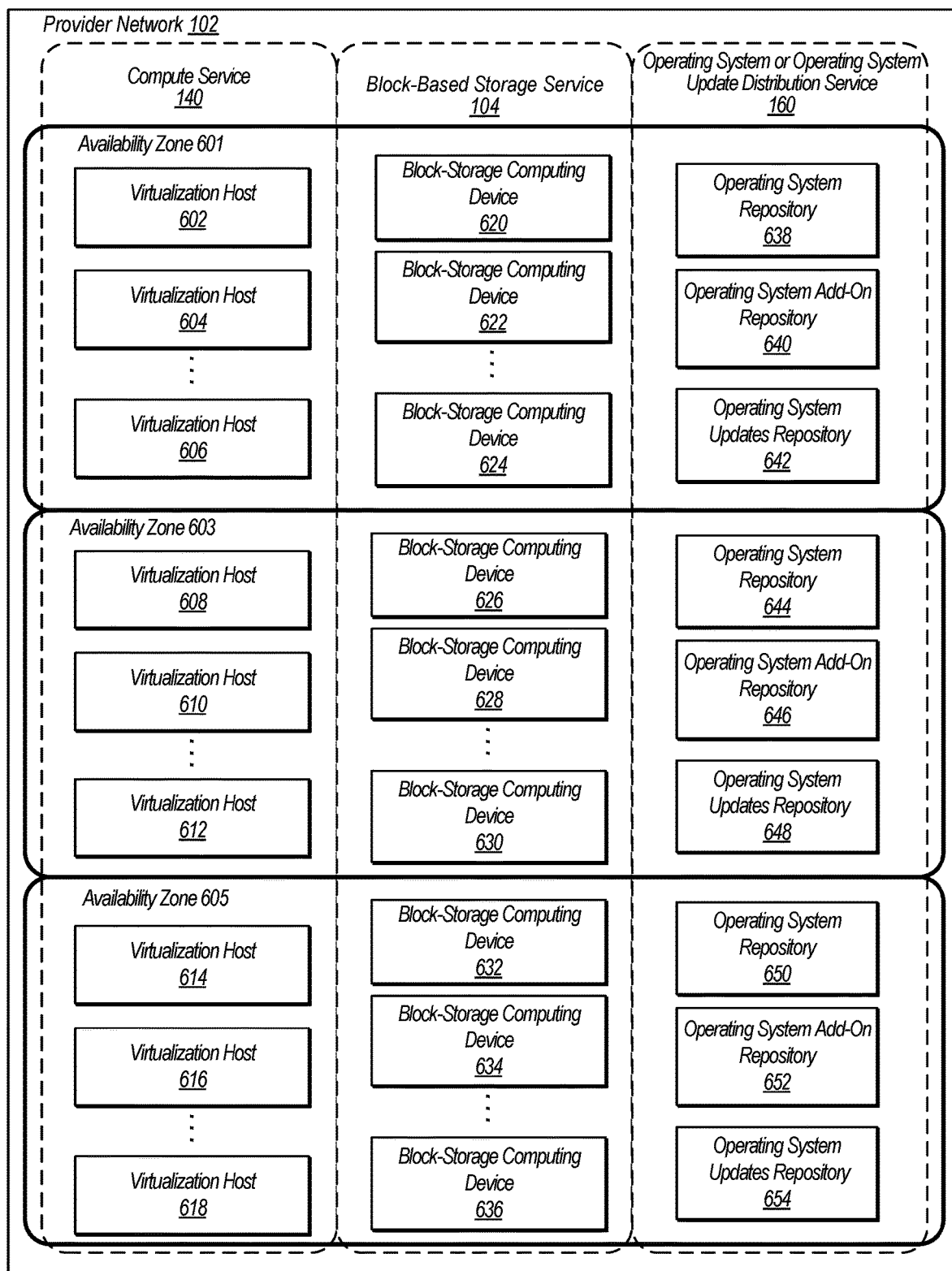
FIG. 6 is a block diagram illustrating a provider network comprising multiple availability zones, wherein respective operating system update repositories of read-only multi-attach volumes are included in multiple ones of the availability zones, according to various embodiments.

FIG. 6 is a block diagram illustrating a provider network comprising multiple availability zones, wherein respective operating system update repositories of read-only multi-attach volumes are included in multiple ones of the availability zones, according to various embodiments.

In some embodiments, duplicate sets of the repositories may be implemented in each of a plurality of different availability zones. For example, compute service 140, block-based storage service 104, and distribution service 160 may be implemented across availability zones 601, 603, and 605, wherein availability zone 601 includes virtualization hosts 602, and 604 through 606 of computing service 140, block-storage computing devices 620, and 622 through 624 of block-based storage service 104, and repositories 638, 640, and 642 of distribution service 160. In a similar manner, availability zone 603 includes virtualization hosts 608, and 610 through 612 of computing service 140, block-storage computing devices 626, and 628 through 630 of block-based storage service 104, and repositories 644, 646, and 648 of distribution service 160. Likewise, availability zone 605 includes virtualization hosts 614, and 616 through 618 of computing service 140, block-storage computing devices 632, and 634 through 636 of block-based storage service 104, and repositories 650, 652, and 654 of distribution service 160.

As can be seen, within a given availability zone, such as availability zone 601, 603, and 605, read-only multi-attach volumes may be built and shared using zone-local repositories. But sharing may not be required to occur across availability zones. Also, as further shown in FIG. 7, in some embodiments, spine-local repositories may be provided to allow for spine-local sharing of read-only multi attach volumes. For example, this may further improve launch times by making the volumes local to the computing instances to which they are attached and therefore reducing network bandwidth used in the launch process.

Figure 7:
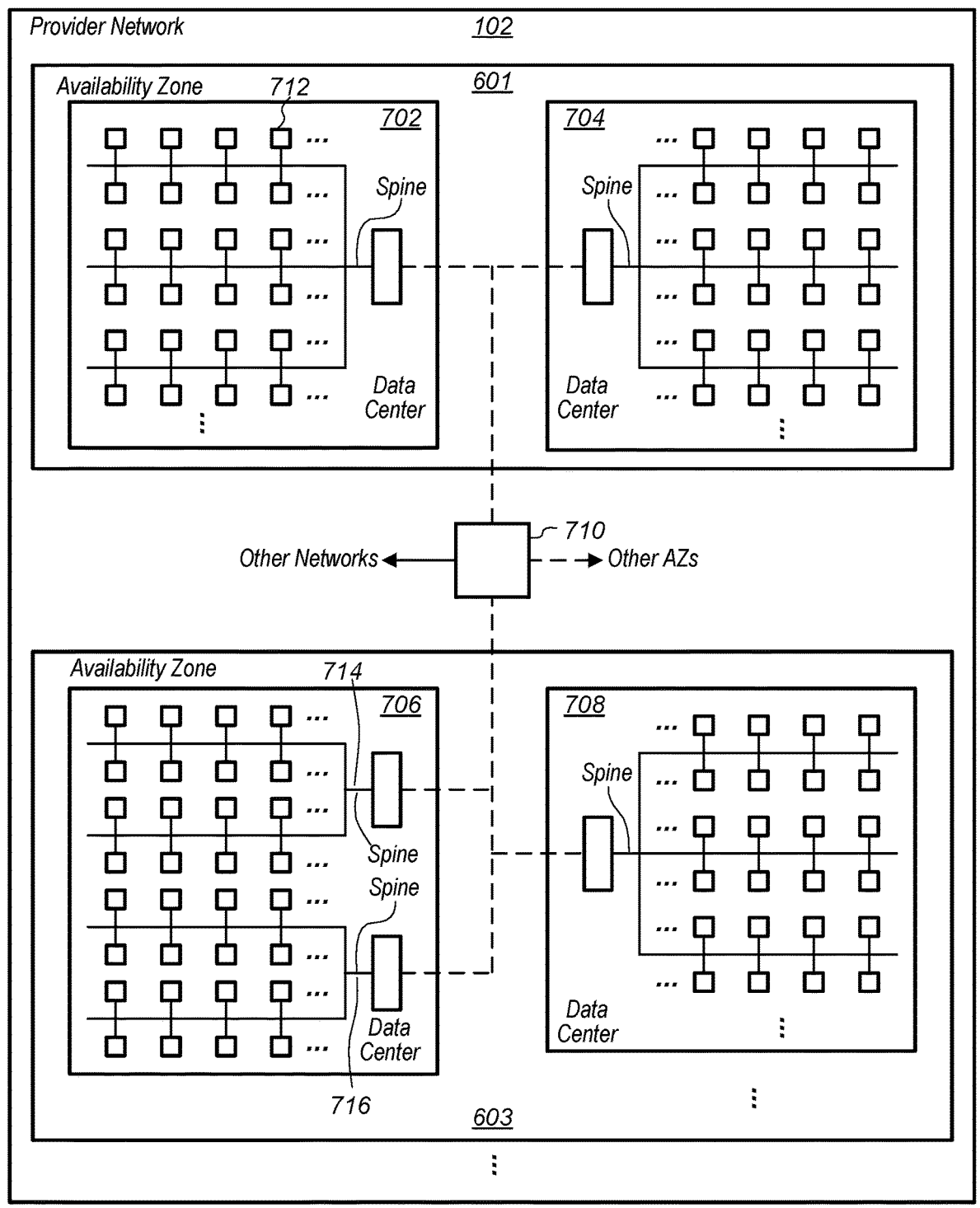
FIG. 7 is a block diagram illustrating additional details about the respective availability zones, wherein respective operating system update repositories of read-only multi-attach volumes are included in multiple network spines of the availability zones, according to some embodiments.

FIG. 7 is a block diagram illustrating additional details about the respective availability zones, wherein respective operating system update repositories of read-only multi-attach volumes are included in multiple network spines of the availability zones, according to some embodiments.

For example, provider network 102 may include availability zones 601 through 605 (as shown in FIG. 6). Availability zone 601 includes data centers 704 and 704, which each include a single network spine. Availability zone 603 includes data centers 706 and 708. Data center 708 includes a single network spine, and data center 706 includes two network spines, spine 716 and 716. In some embodiments, each of the spines included in data centers 702, 704, 706, and 708 may include storage hosts, compute hosts, and one or more networking devices. In some embodiments, as indicated by ellipses, a network spine may include any number of storage hosts and/or compute hosts. Also, as indicated by ellipses, in some embodiments, a network spine may include any number of aisles of racks that include compute and/or storage servers that function as compute hosts and/or storage hosts. For example, data center 702 may include any number of racks 712 that include compute and/or storage servers mounted in the racks and organized into aisles in data center 702. In some embodiments, replicas of volumes may be placed in storage hosts located in different racks of a common network spine. For example, in some embodiments a storage volume may be placed on a storage host in a particular one of racks 712 in data center 702 and a replica of the storage volume may be placed on another storage host located in another one of the racks 712 in data center 702. In some embodiments, a given one of racks 712 may include compute servers that function as compute hosts, storage servers that function as storage hosts, or a combination of types of resources, e.g., both compute and storage servers that function as both compute and storage hosts.

In some embodiments, a provider network such as provider network 102, may include a transit center, such as transit center 710. A transit center, such as transit center 710, may include one or more large scale routers or other types of networking devices. A transit center, such as transit center 710, may provide connections and routing between network spines such as the different network spines in data centers 702, 704, 706, and 708 and network spines in other availability zones of a provider network. Also, a transit center may provide connections to other networks such as client networks or public networks, such as the Internet.

In some embodiments, repositories of an operating system distribution service and resulting sharing of read-only multi-attach volumes may be implemented at different granularities, such as at the rack level, the network spine level, the data center level, or the availability zone level.

Figure 8:
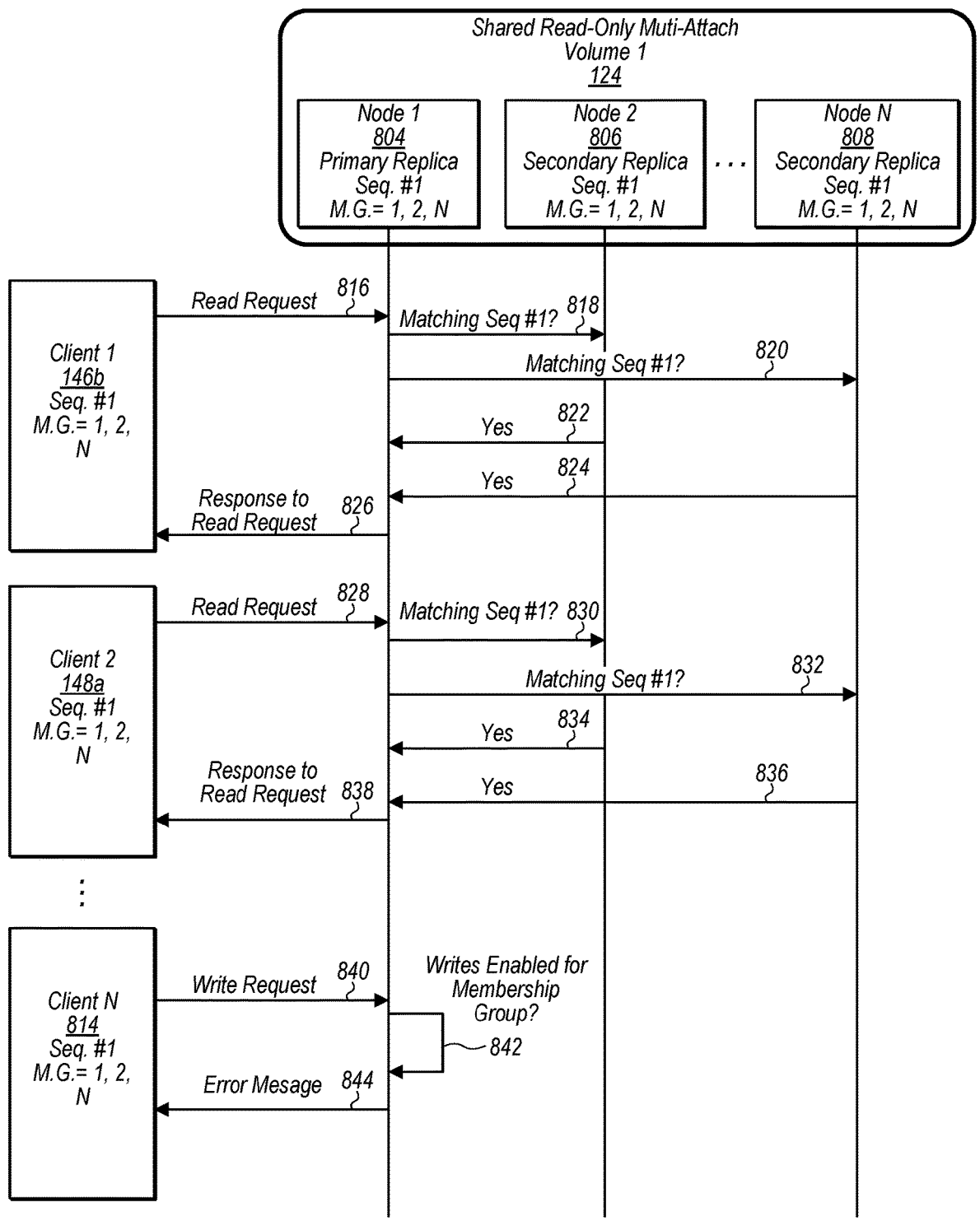
FIG. 8 is a flow diagram illustrating multiple attached computing instance clients reading operating system instructions from a single shared read-only multi-attach volume, according to some embodiments.

FIG. 8 is a flow diagram illustrating multiple attached computing instance clients reading operating system instructions from a single shared read-only multi-attach volume, according to some embodiments.

FIG. 8 illustrates a logical volume 1 (124) implemented via node 1 (804), node 2 (806) and node "N" (808) of a block-based storage service. For example, in some embodiments, nodes 1, 2, and "N" may be computing devices of a block-based storage service, such as computing devices 106, 108, and 110 of block-based storage service 104 illustrated in FIG. 1. FIG. 3 also illustrates client computing devices attached to logical volume 1 (124). The client computing devices include client 1 (146*b*), client 2 (148*a*) and client "N" (814). In some embodiments any number of client computing devices may be attached to a logical volume. In some embodiments, clients 1–N may be client computing devices such as client computing devices 146, and 148 as illustrated in FIG. 1.

Under normal conditions, (e.g., no failure or transition/failover in progress) each node implementing a logical volume may locally store a latest sequence number and membership group information for the logical volume, wherein the nodes store the same sequence number and membership group information for the logical volume. For example, node 1 (804), node 2 (806) and node "N" (808) all locally store sequence number "1" as a latest authorized sequence number for logical volume 1 (124). Also, node 1 (804), node 2 (806) and node "N" (808) all locally store membership group information indicating that nodes 1, 2, and N are included in a membership group associated with sequence number "1" for logical volume 1 (124). In some embodiments, an order in which members are listed in membership group information may indicate relative priorities of the members. For example, the ordering of node 1 before nodes 2 and "N" may indicate that node 1 is a primary node for the logical volume and nodes 2 and "N" are secondary nodes for the logical volume (e.g., node 1 stores a primary replica and nodes 2 and "N" store secondary replicas).

In some embodiments, each client computing device connected to a logical volume, such as client 1 (146*b*), client 2 (148*a*), and client "N" (814), may locally store a latest sequence number for the logical volume and associated membership group information. For example, nodes 1 (804), 2 (806), and 3 (808) each store sequence number "1" for logical volume 1 (124) and membership group information indicating that node 1 (804) is a primary node for the logical volume 1 (124) and nodes 2 (806) and "N" (808) are secondary nodes for the logical volume 1 (124) (e.g., they store secondary replicas of the logical volume).

At 316, client 1 (146*b*) sends a read request 816 to primary node 1 (804). In response to receiving the read request 816, the primary node 1 (804) is configured to send a sequence number verification request to other members of the membership group to verify that another member of the membership group has not moved on to a larger sequence number, thus potentially leaving primary node 1 as a stale primary node that has been superseded.

For example, primary node 1 (804) sends sequence number verification requests 818 and 820 to node 2 (806) and node "N" (808), respectively. In response, nodes 2 (806) and "N" (808) send messages 822 and 824 that can be used to verify up-to-date sequence numbers between the nodes. In some embodiments, the secondary nodes, such as node 2 (806) and node "N" (808) may perform a verification of matching sequence numbers and send a confirmation or declination message. In other embodiments, the secondary nodes, such as node 2 (806) and node "N" (808) may send a message comprising their respective locally stored sequence numbers and a primary node, such as primary node 1 (804) may perform a verification of matching sequence numbers. If any of the matching sequence number verifications fail, the primary node 1 (804) may decline to perform the request read. In some embodiments, the primary node 1 (804) may refer the requesting client to a membership group authority to obtain a latest up-to-date sequence number and membership information for the logical volume. In some embodiments, the primary node 1 (804) may provide along with a message declining to perform the read, a latest sequence number and membership group information for the logical volume. In such cases, a client may then contact a primary node indicated in the membership group information associated with the latest sequence number for the logical volume to perform the read. The client may then direct the read request to a latest primary node.

If both of the messages 822 and 824 indicate that the secondary nodes 806 and 808 locally store a matching sequence number as stored at primary node 1 (804), the primary node may send read response 826 to client 1 (146*b*). Because, primary node 1 (804) has verified that no other nodes have superseded the primary node, the primary node 1 (804) can guarantee to the client 1 (146*b*) that the data included in the read response 826 is the latest version of the data for the logical volume. In some embodiments, peer confirmation messages, e.g., messages 818, 820, 822, and 824 may be small compared to a size of the data being read. For example, the peer confirmation messages may be approximately 200 bytes, as compared to read responses which may comprise, as an example 16 KB.

A similar process may be performed at 828 through 838 for client 2 (148*a*). However, because volume 1 (124) is a read-only volume, write request 840 sent from client N (814) may be rejected. For example, at 842 the primary node 1 (804) may determine that writes are not authorized for volume 1 (124) are return error message 844. As mentioned above, using read-only multi-attach volumes for software distribution may provide a tamper resistant guarantee to customers.

Figure 9:
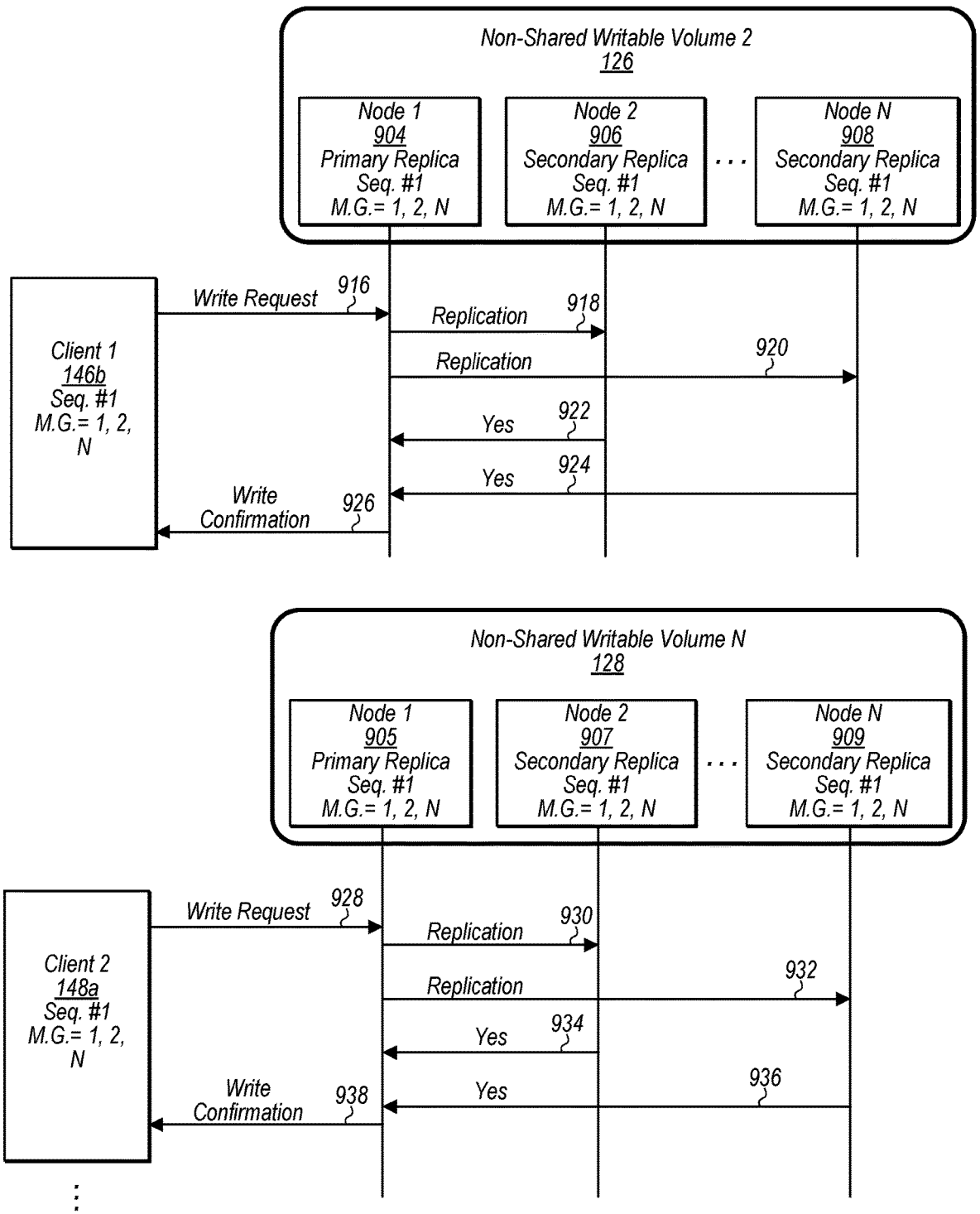
FIG. 9 is a flow diagram illustrating computing instances using separate attached non-shared writable volumes to write data as part of performing a launch process of an operating system, according to some embodiments.

FIG. 9 is a flow diagram illustrating computing instances using separate attached non-shared writable volumes to write data as part of performing a launch process of an operating system, according to some embodiments.

Non-shared writable volume 2 (126) may be implemented using node 1 (904), node 2 (906), and node N (908), and may be attached to client 1 (146*b*) and non-shared writable volume N (128) may be implemented using node 1 (905), node 2 (907), and node N (909), and may be attached to client 2 (148*a*). Client 1 (146*b*) may submit write request 916, which may be replicated to node 2 (906) and node N (908) (e.g., at 918 and 920), and confirmed at 922 and 924 back to node 1 (904), which may return write confirmation 926 to client 1 (146*b*). Likewise, a similar process may be performed for client 2 (148*a*) attached to a different non-shared writable volume N (128) implemented using nodes 905, 907, and 909. For example, at 928-938 a write may be committed in a similar manner. However, while clients 1 (146*b*) and 2 (148*a*) share a common shared multi-attach volume (as shown in FIG. 8), each client is provided their own non-shared writable volume, as shown in FIG. 9.

Figure 10:
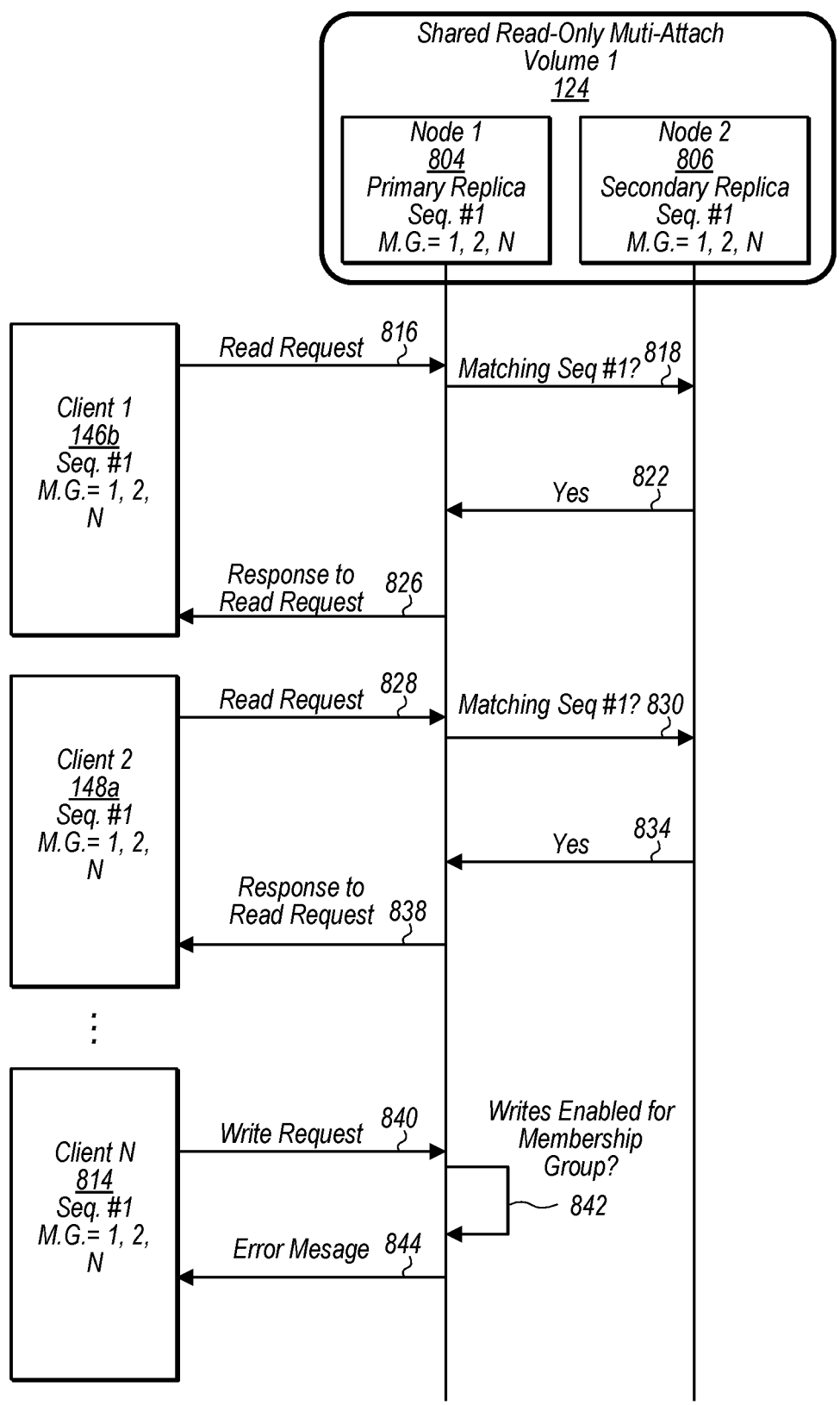
FIG. 10 is a flow diagram illustrating a shared read-only multi-attach volume that is provided using fewer replicas, according to some embodiments.

FIG. 10 is a flow diagram illustrating a shared read-only multi-attach volume that is provided using fewer replicas, according to some embodiments. In some embodiments, durability requirements for read-only operating system distribution volumes may be relaxed. For example, in FIG. 10 fewer replicas are used. For example, in a situation where a failure leads to a loss of a volume, the read-only volume can easily be re-built from snapshots. Thus, it may be a more optimal implementation to use fewer replicas and rely on snapshots to recover from a volume failure, as opposed to using more replicas to avoid a volume failure.

Figure 11:
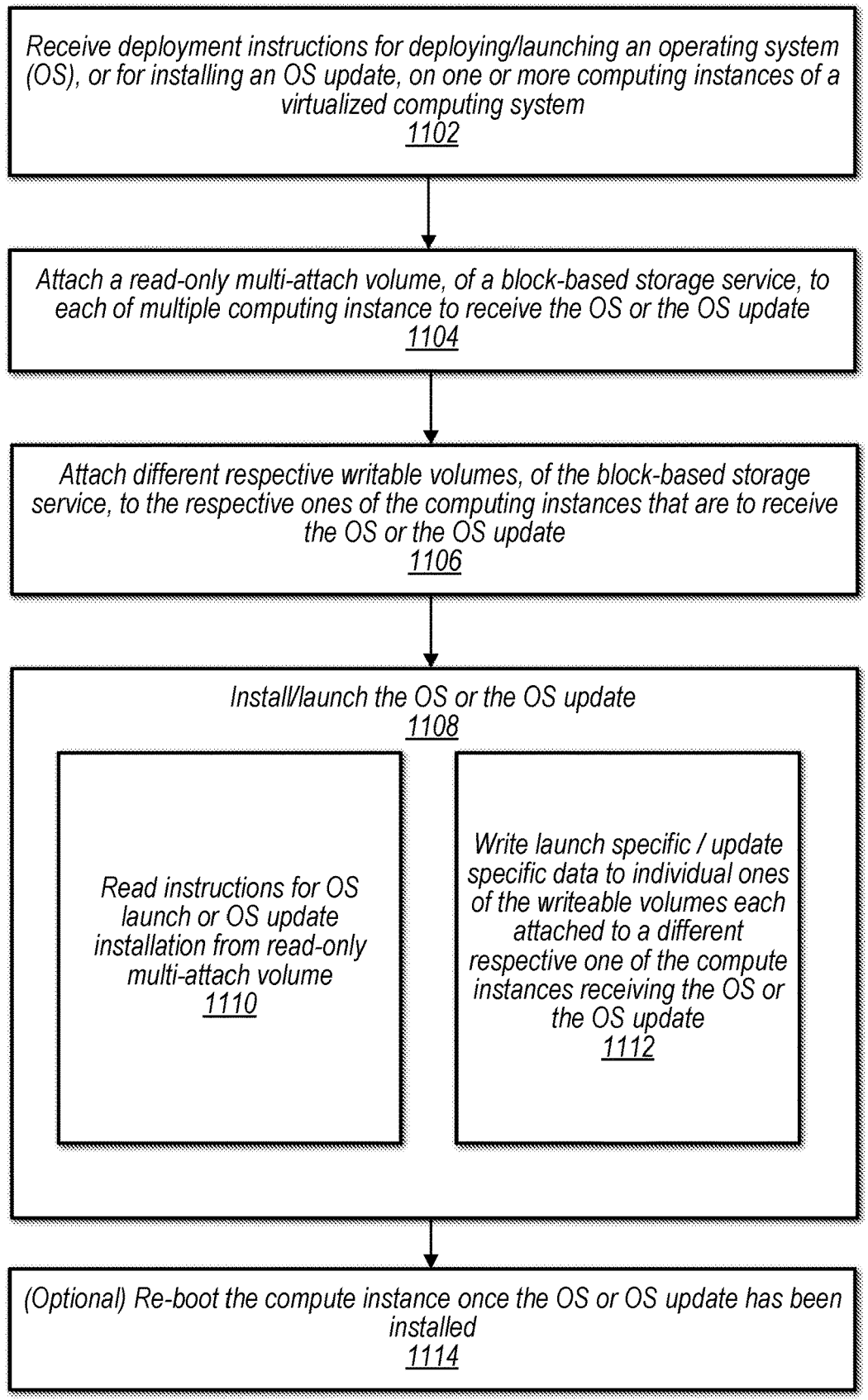
FIG. 11 is a process diagram illustrating a process of distributing an operating system or an operating system update using a shared read-only multi-attach volume, according to some embodiments.

FIG. 11 is a process diagram illustrating a process of distributing an operating system or an operating system update using a shared read-only multi-attach volume, according to some embodiments.

At block 1102, a distribution service, such as distribution service 160, receives deployment instructions for deploying/launching an operating system (OS), or for installing an OS update, on one or more computing instances of a virtualized computing system. Then at block 1104, a read-only multi-attach volume of a block-based storage service is attached to each of multiple computing instances that are to receive the operating system (OS) or operating system update (OS update). Also, at block 1106, separate writable volumes are attached to each of the multiple computing instances. Next at block 1108, the OS or OS update is distributed.

For example, as part of the OS or OS update distribution instructions for OS launch or update are read from the shared read-only multi attach volume while at block 1112, launch specific (or update specific) data is written to the separate writable volumes attached to the respective ones of the computing instances.

Also, at block 1114, an optional re-boot of one or more of the computing instances may be performed.

Figure 12:
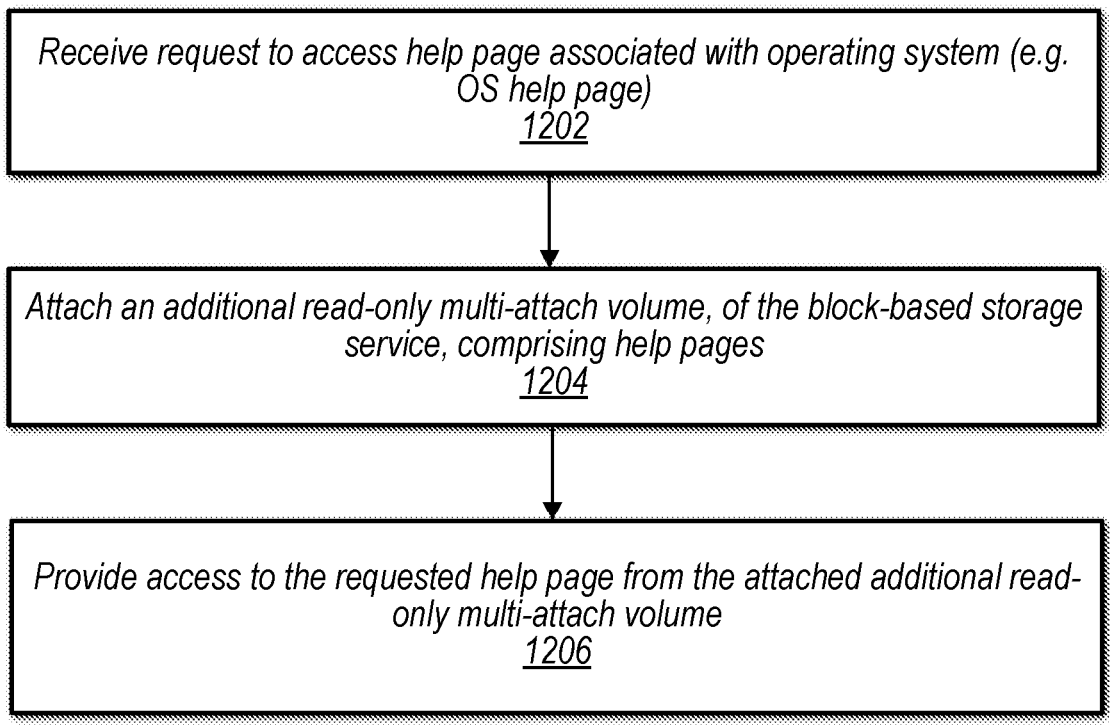
FIG. 12 is a process diagram illustrating a process of distributing help pages for an operating system using shared read-only multi-attach volumes, according to some embodiments.

FIG. 12 is a process diagram illustrating a process of distributing help pages for an operating system using shared read-only multi-attach volumes, according to some embodiments.

At block 1202, a request to access a help page associated with an operating system (that has been distributed as described above) is received. At block 1204, in response to receiving the request at 1202, an additional read-only multi-attach volume is attached to the computing instance associated with the request for the help page. In some embodiments, a single volume may include all help page information or multiple volumes may be used and, in such embodiments, a volume comprising help page information relevant to the query may be selected to be attached. Finally, at block 1206, access is provided to the requested help page using the additional read-only multi-attach volume that was attached to provide the help page information. A similar process may be used to distribute de-bug pages, wherein the de-bug pages are segregated into separate volumes that are only provided (e.g., attached) upon demand.

Figure 13:
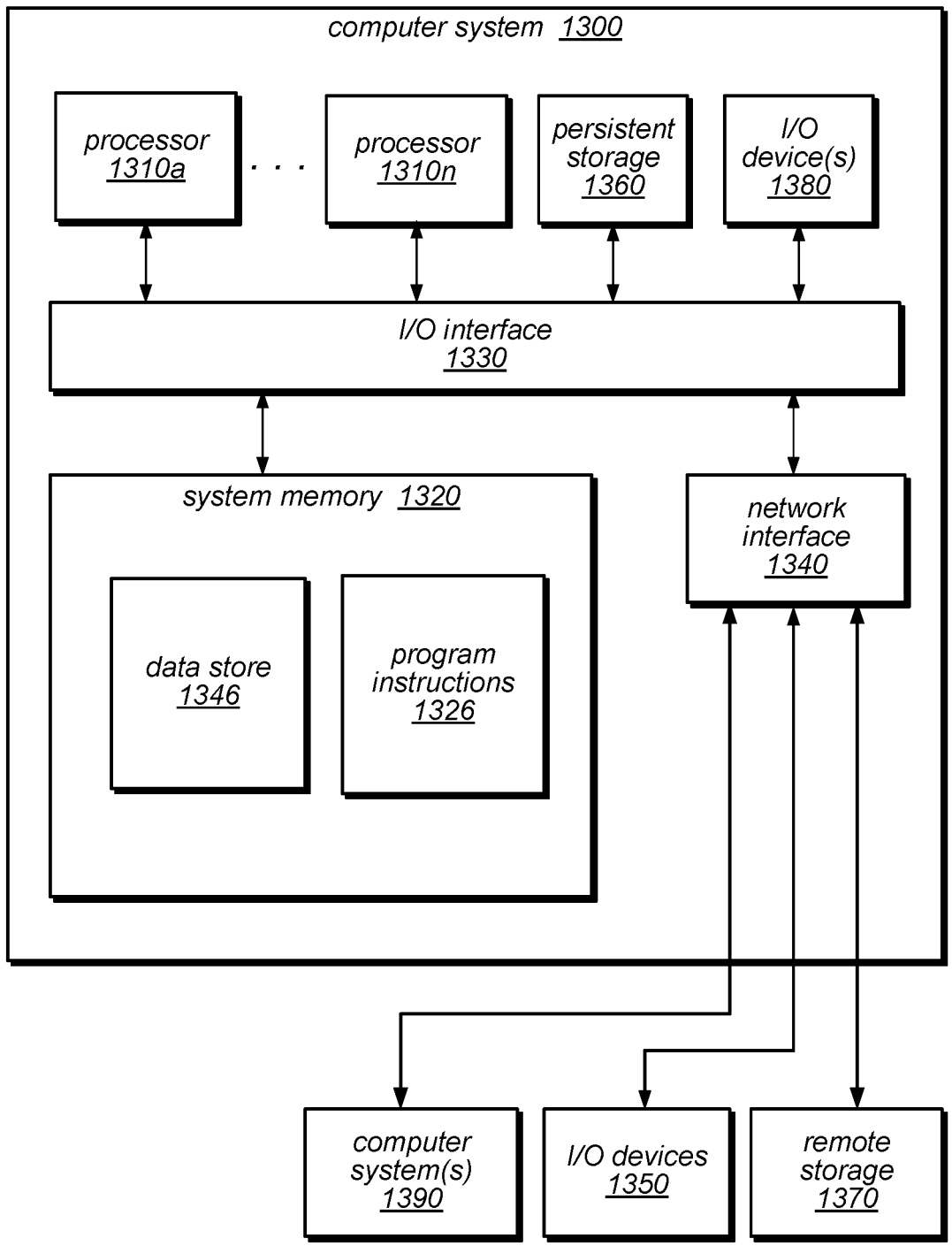
FIG. 13 is a block diagram illustrating an example computer system, according to various embodiments.

FIG. 13 is a block diagram illustrating an example computer system, according to various embodiments. For example, computer system 1300 may be configured to implement storage and/or compute nodes of a compute cluster, a data stores, and/or a client, in different embodiments. Computer system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1300 includes one or more processors 1310 (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g., Internet, LAN, etc.).

In the illustrated embodiment, computer system 1300 also includes one or more persistent storage devices 1360 and/or one or more I/O devices 1380. In various embodiments, persistent storage devices 1360 may correspond to disk drives, tape drives, solid state memory, other mass storage devices, block-based storage devices, or any other persistent storage device. Computer system 1300 (or a distributed application or operating system operating thereon) may store instructions and/or data in persistent storage devices 1360, as desired, and may retrieve the stored instruction and/or data as needed. For example, in some embodiments, computer system 1300 may host a storage system server node, and persistent storage 1360 may include the SSDs attached to that server node.

Computer system 1300 includes one or more system memories 1320 that are configured to store instructions and data accessible by processor(s) 1310. In various embodiments, system memories 1320 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques described herein. In various embodiments, program instructions 1325 may be encoded in platform native binary, any interpreted language such as Java™ byte-code, or in any other language such as C/C++, Java™, etc., or in any combination thereof. For example, in the illustrated embodiment, program instructions 1325 include program instructions executable to implement the functionality of a resource host, in different embodiments. In some embodiments, program instructions 1325 may implement multiple separate clients, nodes, and/or other components.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1345, which may be configured as described herein. In general, system memory 1320 (e.g., data store 1345 within system memory 1320), persistent storage 1360, and/or remote storage 1370 may store data blocks, replicas of data blocks, metadata associated with data blocks and/or their state, configuration information, and/or any other information usable in implementing the methods and techniques described herein.

In one embodiment, I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems 1390, for example. In addition, network interface 1340 may be configured to allow communication between computer system 1300 and various I/O devices 1350 and/or remote storage 1370. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices configured to implement a computing service;
one or more computing devices configured to implement a block-based storage service, the block-based storage service configured to provide block-based storage to computing instances of the computing service; and
one or more computing devices configured to implement an operating system management service, configured to:
receive an instruction to deploy operating system software to a set of computing instances of the computing service; and
cause the operating system software to be deployed using read-only multi-attach volumes of the block-based storage service,
wherein the block-based storage service is further configured to:
provide a shared read-only multi-attach volume for attachment to the set of computing instances to receive deployment of the operating system software; and
provide separate respective non-shared writable volumes for attachment to the respective computing instances of the set,
wherein:
read operations are performed on the shared read-only multi-attach volume to deploy the operating system software to the set of computing instances; and
write operations invoked as part of deploying the operating system software are written to the respective non-shared writeable volumes.

2. The system of claim 1, wherein:
the read-only multi-attach volume stores instructions for installing the operating system software, and
the instructions comprise instructions to direct the write operations invoked as part of deploying the operating system software, to the non-shared writable volumes.

3. The system of claim 1, wherein the read-only multi-attach volume stores instructions for installing the operating system software, and
wherein the operating system management service is configured to:
implement an update agent configured to identify write operations invoked as part of deploying the operating system software, and redirect the write operations to be performed on the non-shared writable volumes.

4. The system of claim 1, wherein the operating management system service, is configured to:
in response to receiving the instruction to deploy the operating system software:
identify a first read-only multi-attach volume comprising a base version of the operating system software;
identify one or more additional read-only multi-attach volumes comprising additions or variations to the base version of the operating system software; and
cause the first read-only multi-attach volume and the one or more additional read-only multi attach volumes to be attached to a given computing instance upon which the operating system software is to be installed.

5. The system of claim 1, wherein:
the computing service and the block-based storage service are services of a service provider network comprising a plurality of availability zones, and
the operating management system service causes a plurality of instances of instructions for installing the operating system software, to be stored on a plurality of respective read-only multi-attach volumes stored in the plurality of availability zones.

6. The system of claim 5, wherein, for each availability zone, the operating management system service causes respective instances of instructions for installing the operating system software to be stored on respective read-only multi-attach volumes stored in different respective network spines of the respective availability zone.

7. The system of claim 1, wherein the block-based storage system is configured to store the read-only multi-attach volume used to perform operating system software installation, or operating system software updates, using less redundancy than is used to store data for other types of volumes.

8. A method, comprising:
receiving instructions to deploy operating system software, to one or more computing instances of a computing service;
attaching, to each of the one or more computing instances, a read-only multi-attach block-storage volume comprising instructions for installing the operating system software;
attaching, to each of the one or more computing instances, separate respective non-shared writable block storage volumes; and
installing the operating system software, wherein:
read operations are performed on the shared read-only multi-attach block-storage volume; and
write operations invoked as part of the installing the operating system software are written to the separate respective non-shared writeable block storage volumes.

9. The method of claim 8, further comprising:
attaching an additional read-only multi-attach block storage volume to one or more of the computing instances, wherein:
the read-only multi-attach block storage volume comprises instructions for installing a base version of the operating system software; and
the additional read-only multi-attach block-storage volume comprises instructions for installing additional features for the operating system software, that enable installation of a customized version of an operating system, or an operating system update.

10. The method of claim 8, wherein the read-only multi-attach block-storage volume is attached to the one or more computing instances while in a running state and the installing of the operating system software, or an operating system software update, is applied to the one or more computing instances in the running state.

11. The method of claim 8, further comprising:
re-booting the one or more computing instances, subsequent to installing the operating system software or operating system software update.

12. The method of claim 8, wherein the read-only multi-attach block storage volume is provided by a block-based storage service of a service provider network, and wherein the service provider network maintains exclusive control over contents of the read-only multi-attach block storage volume.

13. The method of claim 8, further comprising:
selecting the read-only multi-attach block-storage volume comprising the instructions for installing the operating system software, based on an availability zone in which respective ones of the computing instances are located, wherein a plurality of copies of the instructions for installing the operating system software are stored on respective ones of a plurality of read-only multi-attach block-storage volumes stored in different ones of the availability zones.

14. The method of claim 13, further comprising:
selecting the read-only multi-attach block storage volume comprising the instructions based on one or more network spines in a given availability zone where the respective ones of the computing instances are located, wherein a plurality of copies of the instructions for installing the operating system software, are stored on respective ones of a plurality of read-only multi-attach block-storage volume stored in different ones of the network spines of the respective availability zones.

15. The method of claim 8, wherein the multi-attach block-storage volume is provided by an operating system management service such that the instructions for installing the base version of the operating system software, do not substantially consume block-storage space of a block-storage volume allocated to a customer of the computing service and attached to the customer's computing instance.

16. The method of claim 8, further comprising:
receiving an indication of a request to access one or more help pages or debug information associated with the operating system software; and
retrieving, in response to the indication, the one or more help pages or debug information,
wherein the one or more help pages or debug information are stored separately from the instructions stored on the read-only multi-attach block storage volume.

17. A system comprising:
one or more computing devices configured to implement a block-based storage service configured to:
provide a shared read-only multi-attach volume for attachment to a set of computing instances to receive deployment of operating system software; and
provide separate respective non-shared writable volumes for attachment to the respective computing instances of the set,
wherein:
read operations are performed on the shared read-only multi-attach volume to deploy the operating system software to the set of computing instances; and
write operations invoked as part of deploying the operating system software are written to the respective non-shared writeable volumes.

18. The system of claim 17, further comprising:
one or more computing devices configured to implement an operating system management service, configured to:
receive an instruction to deploy the operating system software to one or more computing instances of a computing service; and
cause the operating system software to be deployed using the read-only multi-attach volume of the block-based storage service.

19. The system of claim 18, wherein:
the operating system management service is configured to:
identify respective sets of shared read-only multi-attach volumes comprising instructions for implementing a base version of the operating system software and comprising instructions for implementing different respective additional features for the operating system software; and
cause the respective sets of shared read-only multi-attach volumes to be attached to respective computing instances of the set of computing instances to deploy customized versions of the operating system software to the computing instances of the set.

20. The system of claim 17, wherein the block-based storage service is configured to apply a lower durability requirement to the shared read-only multi-attach volume than is applied to other volumes used to store customer data.

* * * * *